(12) United States Patent
Bäckström et al.

(10) Patent No.: US 12,272,121 B2
(45) Date of Patent: Apr. 8, 2025

(54) IMAGE PROCESSING DEVICE, SYSTEM, AND METHOD

(71) Applicant: ABX-CRO advanced pharmaceutical services Forschungsgesellschaft mbH, Dresden (DE)

(72) Inventors: Karl Bäckström, Gothenburg (SE); Mahmood Nazari, Dresden (DE); Andreas Kluge, Dresden (DE)

(73) Assignee: ABX-CRO advanced pharmaceutical services Forschungsgesellschaft m.b.H, Dresden (DE)

( * ) Notice: Subject to any disclaimer, the term of this patent is extended or adjusted under 35 U.S.C. 154(b) by 556 days.

(21) Appl. No.: 17/681,187

(22) Filed: Feb. 25, 2022

(65) Prior Publication Data

US 2022/0277550 A1 Sep. 1, 2022

(30) Foreign Application Priority Data

Feb. 26, 2021 (EP) ...................... 21159692

(51) Int. Cl.
*G06V 10/774* (2022.01)
*G06N 20/00* (2019.01)
(Continued)

(52) U.S. Cl.
CPC .......... *G06V 10/774* (2022.01); *G06N 20/00* (2019.01); *G06T 7/0012* (2013.01);
(Continued)

(58) Field of Classification Search
CPC .............. G06V 10/764; G06V 10/774; G06V 10/776; G06V 10/7788; G06N 20/00; G06T 7/0012; G06T 2207/20084
See application file for complete search history.

(56) References Cited

U.S. PATENT DOCUMENTS 8,965,621 B1 2/2015 Urmson et al.
2016/0073969 A1 3/2016 Ithapu et al.
(Continued)

FOREIGN PATENT DOCUMENTS

WO WO-2019051359 A1 * 3/2019 ......... G06K 9/00671

OTHER PUBLICATIONS

Hicks Steven et al: "Dissecting Deep Neural Networks for Better Medical Image Classification and Classification Understanding", 2018 IEEE 31st International Symposium on Computer-Based Medical Systems (CBMS), IEEE, Jun. 18, 2018 (Jun. 18, 2018), pp. 363-368.
(Continued)

*Primary Examiner* — Daniel G Mariam
(74) *Attorney, Agent, or Firm* — MARSHALL, GERSTEIN & BORUN LLP

(57) ABSTRACT

An image processing device or system, in particular for medical image processing, comprises an interface to receive image data, a storage system, and at least one integrated circuit operative to retrieve an image analysis model from the storage system, perform an image analysis that comprises applying the image analysis model to the image data to generate an image analysis output, generate an explainability signature for the image analysis, process at least the explainability signature to generate cross-check data indicative of a class prediction and/or a possible discrepancy in the image analysis, and initiate a control action that depends on the cross-check data.

23 Claims, 10 Drawing Sheets

(51) Int. Cl.
    *G06T 7/00*     (2017.01)
    *G06V 10/764*     (2022.01)
    *G06V 10/776*     (2022.01)
    *G06V 10/778*     (2022.01)

(52) U.S. Cl.
    CPC .......... *G06V 10/764* (2022.01); *G06V 10/776* (2022.01); *G06V 10/7788* (2022.01); *G06T 2207/20084* (2013.01)

(56) References Cited

U.S. PATENT DOCUMENTS

| | | | | |
|---|---|---|---|---|
| 2020/0193313 | A1* | 6/2020 | Ghanta | G06N 20/00 |
| 2020/0250548 | A1* | 8/2020 | Shwartz | G06F 9/542 |
| 2021/0383262 | A1* | 12/2021 | Elen | G06F 18/2163 |

OTHER PUBLICATIONS

Zhuwei Qin et al: "How convolutional neural network see the world—A survey of convolutional neural network visualization methods", arxiv.org, Cornell University Library, 201 Olin Library Cornell University Ithaca, NY 14853, Apr. 30, 2018 (Apr. 30, 2018), 32 pages.

Wojciech Samek et al: "Explainable Artificial Intelligence: Understanding, Visualizing and Interpreting Deep Learning Models", arxiv.org, Cornell University Library, 201 Olin Library Cornell University Ithaca, NY 14853, Aug. 28, 2017 (Aug. 28, 2017), 8 pages.

Pieter-Jan Kindermans et al: "Learning how to explain neural networks: PatternNet and PatternAttribution", arxiv.org, Cornell University Library, 201 Olin Library Cornell University Ithaca, NY 14853, May 16, 2017 (May 16, 2017), 12 pages.

Extended European Search Report for EP Patent Application No. 21159692.9 mailed Jul. 22, 2021, 12 pages.

L. Chen, S. Wang, W. Fan, J. Sun and S. Naoi, "Beyond human recognition: A CNN-based framework for handwritten character recognition," 2015 3rd IAPR Asian Conference on Pattern Recognition (ACPR), 2015, pp. 695-699, doi: 10.1109/ACPR.2015.7486592.

Litjens G, Kooi T, Bejnordi BE, Setio AAA, Ciompi F, Ghafoorian M, van der Laak JAWM, van Ginneken B, Sánchez CI. A survey on deep learning in medical image analysis. Med Image Anal. Dec. 2017;42:60-88. doi: 10.1016/j.media.2017.07.005. Epub Jul. 26, 2017. PMID: 28778026.

S. Zhang, R. Benenson, M. Omran, J. Hosang and B. Schiele, "Towards Reaching Human Performance in Pedestrian Detection," in IEEE Transactions on Pattern Analysis and Machine Intelligence, vol. 40, No. 4, pp. 973-986, Apr. 1, 2018.

Office Action, European Patent Application No. 21159692.9, dated Jan. 3, 2024.

\* cited by examiner

IMAGE PROCESSING DEVICE, SYSTEM, AND METHOD

CROSS-REFERENCE TO RELATED APPLICATIONS

This present application claims priority to European Patent Application No. 21 159 692.9, filed Feb. 26, 2021, which is hereby incorporated by reference in its entirety.

FIELD OF THE INVENTION

The invention relates to processing devices, systems, and methods. The invention relates in particular to image processing devices, systems, and methods for use in medical image analysis, which make use of one or several artificial intelligence models.

BACKGROUND OF THE INVENTION

In recent years, Artificial Intelligence (AI) and Machine Learning (ML) are being used increasingly in image analysis to automatically draw conclusions, or provide assistance to a human operator. L. Chen, et al., "A cnn-based framework for handwritten character recognition," in 2015 3rd IAPR Asian Conference on Pattern Recognition (ACPR), pages 695-699. IEEE, 2015, G. Litjens et al., "A survey on deep learning in medical image analysis", Medical image analysis, 42:60-88, 2017, S. Zhang et al., "Towards reaching human performance in pedestrian detection." IEEE transactions on pattern analysis and machine intelligence, 40(4): 973-986, 2017, U.S. Pat. No. 8,965,621 B1, and US 2016/0073969 A1 disclose examples for such systems and methods.

These methods are however inherently black-box in their nature, and there are challenges in fully utilizing the benefits of them in many applications. This is mainly due to (i) the fact that it is difficult to understand why a system came to produce a certain output, and (ii) the risk that an AI system draws an incorrect conclusion.

SUMMARY

There is a need in the art for improved devices, systems, and methods for processing image data or other data. There is in particular a need in the art for devices, systems, and methods that enhance safety, with regard to identifying potentially incorrect analysis results and/or with regard to data privacy concerns.

According to embodiments of the invention, an explainability signature determined for a data analysis (e.g., an image analysis) may be processed, using, e.g., an artificial intelligence (AI) model, and an output of the analysis of the explainability signature (referred to as cross-check data herein) may be used to selectively perform an action. For illustration, the cross-check data may be used to determine whether the data analysis result is considered to be reliable (e.g., based on whether the cross-check data and the data analysis result are in conformity), whether the data analysis result is to be flagged, whether the data analysis result may be used as training data for machine learning, ML, and/or whether the data analysis result indicates the suitability of a data analysis model used in the data analysis (e.g., another AI model) to perform the task for which it is being intended.

The AI model may be trained to perform the same classification task as the data analysis applied to the input data, but using at least the explainability signature as an input. Alternatively or additionally, the AI model may be trained to detect a potential erroneous data analysis result.

A control action may be performed based on the cross-check data, and optionally based on other data (such as the data analysis result). The control action may include at least one of: controlling output provided via a human-machine interface (HMI); controlling storage of the results of the data analysis; controlling the provision of feedback to a server for reporting suitability of the data analysis model for performing its desired task; automatically controlling an actuator (e.g., in driver assistance).

According to embodiments of the invention, devices, systems, and methods are provided in which data is analyzed using a first artificial intelligence (AI) model, an explainability signature is generated for the analysis, and the explainability signature is processed using a second AI model. The second AI model may be trained to perform the same classification task as the first AI model, but using at least the explainability signature as an input. Alternatively or additionally, the second AI model may be trained to detect a potential erroneous output of the first AI model. Depending on the output of the second AI model (also referred to as cross-check data herein), a control action may be performed. The control action may be performed based on the cross-check data, and optionally based on other data (such as the data analysis result). The control action may include at least one of: controlling output provided via a human-machine interface (HMI); controlling storage of the results of the data analysis; controlling the provision of feedback to a server for reporting suitability of the data analysis model for performing its desired task; automatically controlling an actuator (e.g., in driver assistance).

According to embodiments of the invention, devices, systems, and methods are provided in which a server provides one or several candidate AI model(s) to a set of local systems. The server may receive an performance metric on the candidate AI model(s) from the set of local systems. The server may determine, based on the performance metric, which of the candidate AI model(s) are to be deployed to the local systems for field use. The performance metric may be based, at least in part, on the results of processing the explainability signature. The server may deploy the candidate AI model(s) that are to be used to a plurality of local systems (which may, but does not need to be identical to the set of local systems that have previously evaluated the candidate AI model(s)). The server may determine which candidate AI model(s) are to be deployed for field use in a data-agnostic manner, i.e., independently of any knowledge of the data to which the local systems have applied the candidate AI model(s) for determining the performance metric.

According to embodiments of the invention, devices, systems, and methods are provided in which a local system (which, e.g., may be installed locally in a medical facility for machine-aided diagnostics and/or which may be installed onboard a vehicle for driver-assistance or autonomous driving) receives one or several candidate AI model(s) from a server. The local system may determine an performance metric for the one or several candidate AI model(s). This may comprise determining cross-check data that depends on an explainability signature. The local system may transmit the performance metric to the server. The performance metric transmitted to the server may be such that it does not include any information on the image data or other data to which the one or several candidate AI model(s) were applied to generate the performance metric.

A processing device or system according to an embodiment comprises an interface to receive input data, a storage system, and at least one integrated circuit. The at least one integrated circuit may be operative to retrieve a data analysis model from the storage system, perform a data analysis that comprises applying the data analysis model to the input data to generate an analysis output, generate an explainability signature for the data analysis, process at least the explainability signature to generate cross-check data indicative of a class prediction and/or a possible discrepancy in the data analysis, and initiate a control action that depends on the cross-check data.

The processing device or system may be an image processing device or system.

The input data may be image data.

The data analysis may be an image analysis.

The data analysis result may be an image analysis result.

The control action that depends on the cross-check data may be or may comprise causing a label that is dependent on the cross-check data to be stored in association with the input data.

The control action that depends on the cross-check data may be or may comprise combining the data analysis output with the cross-check data to generate a consolidated data analysis result.

The consolidated data analysis result may be generated selectively only if data classification results for the input data included in the data analysis output and the cross-check data are in agreement.

The control action that depends on the cross-check data may be or may comprise causing outputting of the cross-check data.

The at least one integrated circuit may be operative to use a labeled dataset comprising the input data and a label that is dependent on the cross-check data for performing machine learning (ML) for an AI model and/or for performing AI model validation.

The at least one integrated circuit may be operative to use the labeled dataset comprising the input data and the label that depends on the cross-check data to perform AI model validation of a candidate AI model received from a server and/or to provide a validation result of the AI model validation to the server.

The validation result may comprise a performance metric of the candidate AI model determined using the labeled dataset.

The image processing device or system may be operative to receive from the server an update for the data analysis model and/or a new data analysis model for use in a subsequent data analysis of other input data responsive to providing the validation result of the AI model validation to the server.

The image processing device or system may further comprise a human machine interface (HMI) operative to output the cross-check data.

The at least one integrated circuit may be operative to control the HMI to output the data analysis result selectively only if the cross-check data and the data analysis result are in agreement.

The at least one integrated circuit may be operative to control the HMI to flag the data analysis result if the cross-check data indicates a possible error in the data analysis.

The at least one integrated circuit may be operative to generate and store the label responsive to a user input received at the HMI.

The at least one integrated circuit may be operative to initiate outputting of the data analysis output selectively dependent on whether the cross-check data indicates that there is no discrepancy between the explainability signature and the data analysis output and/or to flag the data analysis output when the cross-check data indicates that there is a discrepancy between the explainability signature and the data analysis output.

The at least one integrated circuit may be operative to determine the cross-check data to be indicative of an inconsistency between the explainability signature and the data analysis output and/or a systematic issue with the data analysis model, optionally wherein the systematic issue includes at least one of overfitting or underfitting or a drift when training the data analysis model.

The at least one integrated circuit may be operative to execute a second AI model to determine the cross-check data.

The at least one integrated circuit may be operative to train the second AI model in field use of the processing device or system.

The second AI model may be trained with an objective of classifying the input data using inputs that comprise the explainability signature and/or detecting erroneous data analysis output from the data analysis using inputs that comprise the explainability signature.

The second AI model may be trained with an objective of performing a classification using, inter alia, the explainability signature as input.

The classification performed by the second AI model may classify image data into one of a set of two or more discrete classes. The data analysis (which may be implemented by a first AI model) may classify the image data into one class from the same set of two or more discrete classes.

The second AI model may be trained with an objective of detecting an erroneous data analysis output, e.g. with an objective of detecting an discrepancy between the data analysis result, the explainability signature, and the input data.

The second AI model may receive the input data and the explainability signature as input.

The second AI model may receive the input data, the explainability signature, and a confidence score provided by the data analysis as input.

The second AI model may be trained using unsupervised ML.

The second AI model may be trained using supervised ML.

The at least one integrated circuit may be operative to determine the cross-check data using at least one of a principal component analysis (PCA), an artificial neural network (ANN), histogram analysis, K-means clustering.

The at least one integrated circuit may be operative to determine the cross-check data using PCA and/or histogram analysis, followed by K-means clustering.

The at least one integrated circuit may be operative to determine the cross-check data using PCA and/or histogram analysis, a processing a result thereof using an ANN.

The at least one integrated circuit may be operative to determine the cross-check data by processing an N-tuple having elements that comprise at least pixel values or voxel values of the explainability signature.

The N-tuple may have additional elements that comprise pixel or voxel values of the input data.

The N-tuple may have an additional element that is a data analysis output (e.g., an image classification) provided by the data analysis.

The N-tuple may have an additional element that is a confidence score provided by the data analysis.

The N-tuple may have 2 M+1 or 2 M+2 elements, wherein M is the number of voxel or pixel values in the input data, and wherein M is the number of voxel or pixel values in the explainability signature.

The data analysis model may be an ANN model.

A number of input nodes of the ANN may be equal to a number of pixels or voxels in the input data when the input data is an image.

A number of input nodes of the ANN may be greater than a number of pixels or voxels in the input data when the input data is an image.

A number of layers of the ANN may be dependent on the number of pixels or voxels in the input data when the input data is an image.

The data analysis may be implemented using a convolutional neural network (CNN).

The explainability signature may be or may comprise heatmap data.

The heatmap data may quantify, for each of several pixels or voxels of the input data, how strongly the pixel or voxel affects the data analysis output for the input data.

The at least one integrated circuit may be operative to determine the explainability signature using a Layer-wise Relevance Propagation (LRP).

The at least one integrated circuit may be operative to determine the explainability signature using a Patternnet and Pattern-attribution method.

The input data may be medical image data.

The medical image data may be or may comprise magnetic resonance imaging (MRI) image data, computer-tomography (CT) image data, X-ray image data, ultrasound (US) image data, thermography image data, scintigraphy image data, nuclear medicine functional imaging image data such as positron emission tomography (PET) image data or single-photon emission computed tomography (SPECT) image data, in particular scintigraphy of the brain.

The processing device or system may be a device or system for machine-aided diagnostics.

The data analysis output may be indicative of a normal or abnormal physical condition.

The data analysis model may be configured to process image data to identify the presence or absence of an abnormal neurological condition.

The data analysis model may be configured to process image data to identify a type of neurological condition.

The data analysis model may be configured to process image data of a subject's brain to identify the presence or absence of Parkinson's disease and/or Alzheimer's disease.

The data analysis model may be configured to process image data to identify the presence or absence of a cancer in the image data.

The data analysis model may be configured to process image data to identify a type of cancer in the image data.

The processing device or system may be arranged locally in a medical facility in which a medical imaging modality is provided to capture the image data.

The processing device or system may comprise a medical imaging modality coupled to the interface.

The medical imaging modality may comprise at least one of: a MRI system, a CT system, an X-ray system, an US system, a thermography system, a scintigraphy system, a nuclear medicine functional imaging system such as a PET or SPECT system, in particular a DaTSCAN system.

A medical imaging system according to an embodiment comprises a medical imaging modality and a processing device or system according to an embodiment.

The medical imaging modality may comprise or may be at least one of: a MRI system, a CT system, an X-ray system, an US system, a thermography system, a scintigraphy system, a nuclear medicine functional imaging system such as a PET or SPECT system, in particular a DaTSCAN system.

A distributed computing system according to an embodiment comprises a plurality of data processing devices or systems. At least some of the data processing devices or systems may be a processing device or system according to an embodiment.

The distributed computing system may further comprise a server operative to be communicatively coupled to the plurality of data processing devices or systems.

The server may be operative to provide candidate AI models to at least a subset of the plurality of image processing devices or systems for validation.

The server may be operative to receive validation results from the subset of the plurality of data processing devices or systems.

The server may be operative to decide which one(s) of the candidate AI models is/are to be deployed to the plurality of data processing devices or systems based on the received validation results.

The server may be operative to deploy the candidate AI model(s) selected based on the validation results to the plurality of data processing devices or systems.

The validation results may comprise or may be dependent on the cross-check data determined by the plurality of image processing devices or systems when using the candidate AI models.

The validation may be data-agnostic. The validation results received by the server may be independent of, and may not allow the server to infer, the input data to which the candidate AI models were applied by the plurality of image processing devices or systems.

The distributed computing system may be operative to perform data-agnostic distributed learning.

The distributed computing system may be operative to use data collected in databanks of the plurality of data processing devices or systems for distributed machine learning of a first AI model that processes the input data and/or a second AI model that processes at least the explainability signature.

At least one or several of the data processing devices or systems may be operative to transmit updates to the first AI model that processes the input data and/or the second AI model that processes at least the explainability signature to one or several other data processing devices or systems and/or the server.

The updates to the first AI model that processes the input data and/or the second AI model that processes at least the explainability signature may be based at least one the cross-check data determined during field use by applying the second AI model to, inter alia, the explainability signature.

A method according to an embodiment comprises the following steps performed by a processing device or system: performing a data analysis that comprises applying a data analysis model to input data to generate a data analysis output; generating an explainability signature for the data analysis; processing at least the explainability signature to generate cross-check data indicative of a class prediction and/or a possible discrepancy in the data analysis; and initiating a control action that depends on the cross-check data.

The processing device or system may be an image processing device or system.

The input data may be image data.

The data analysis may be an image analysis.

The data analysis result may be an image analysis result.

The control action that depends on the cross-check data may be or may comprise causing a label that is dependent on the cross-check data to be stored in association with the input data.

The control action that depends on the cross-check data may be or may comprise combining the data analysis output with the cross-check data to generate a consolidated data analysis result.

The consolidated data analysis result may be generated selectively only if data classification results for the input data included in the data analysis output and the cross-check data are in agreement.

The control action that depends on the cross-check data may be or may comprise causing outputting of the cross-check data.

A labeled dataset comprising the input data and a label that is dependent on the cross-check data may be used for performing ML for an AI model and/or for performing AI model validation.

The labeled dataset comprising the input data and the label that depends on the cross-check data may be used to perform AI model validation of a candidate AI model received from a server and/or to provide a validation result of the AI model validation to the server.

The validation result may comprise a performance metric of the candidate AI model determined using the labeled dataset.

The method may comprise receiving, from the server, an update for the data analysis model and/or a new data analysis model for use in a subsequent data analysis of other input data responsive to providing the validation result of the AI model validation to the server.

The method may comprise outputting the cross-check data via a HMI.

The method may comprise controlling the HMI to output the data analysis result selectively only if the cross-check data and the data analysis result are in agreement.

The method may comprise controlling the HMI to flag the data analysis result if the cross-check data indicates a possible error in the data analysis.

The method may comprise generating and storing the label responsive to a user input received at the HMI.

The method may comprise outputting of the data analysis output selectively dependent on whether the cross-check data indicates that there is no discrepancy between the explainability signature and the data analysis output and/or flagging the data analysis output when the cross-check data indicates that there is a discrepancy between the explainability signature and the data analysis output.

The method may comprise determining the cross-check data to be indicative of an inconsistency between the explainability signature and the data analysis output and/or a systematic issue with the data analysis model, optionally wherein the systematic issue includes at least one of overfitting or underfitting or a drift when training the data analysis model.

The method may comprise executing a second AI model to determine the cross-check data.

The method may comprise training the second AI model in field use of the processing device or system.

The second AI model may be trained with an objective of classifying the input data using inputs that comprise the explainability signature and/or detecting erroneous data analysis output from the data analysis using inputs that comprise the explainability signature.

The second AI model may be trained with an objective of performing a classification using, inter alia, the explainability signature as input.

The classification performed by the second AI model may classify image data into one of a set of two or more discrete classes. The data analysis (which may be implemented by a first AI model) may classify the image data into one class from the same set of two or more discrete classes.

The second AI model may be trained with an objective of detecting an erroneous data analysis output, e.g. with an objective of detecting an discrepancy between the data analysis result, the explainability signature, and the input data.

The second AI model may receive the input data and the explainability signature as input.

The second AI model may receive the input data, the explainability signature, and a confidence score provided by the data analysis as input.

The second AI model may be trained using unsupervised ML.

The second AI model may be trained using supervised ML.

The method may comprise determining the cross-check data using at least one of a principal component analysis (PCA), an artificial neural network (ANN), histogram analysis, K-means clustering.

The method may comprise determining the cross-check data using PCA and/or histogram analysis, followed by K-means clustering.

The method may comprise determining the cross-check data using PCA and/or histogram analysis, a processing a result thereof using an ANN.

The method may comprise determining the cross-check data by processing an N-tuple having elements that comprise at least pixel values or voxel values of the explainability signature.

The N-tuple may have additional elements that comprise pixel or voxel values of the input data.

The N-tuple may have an additional element that is a data analysis output (e.g., an image classification) provided by the data analysis.

The N-tuple may have an additional element that is a confidence score provided by the data analysis.

The N-tuple may have 2 M+1 or 2 M+2 elements, wherein M is the number of voxel or pixel values in the input data, and wherein M is the number of voxel or pixel values in the explainability signature.

The data analysis model may be an ANN model.

A number of input nodes of the ANN may be equal to a number of pixels or voxels in the input data when the input data is an image.

A number of input nodes of the ANN may be greater than a number of pixels or voxels in the input data when the input data is an image.

A number of layers of the ANN may be dependent on the number of pixels or voxels in the input data when the input data is an image.

The data analysis may be implemented using a CNN.

The explainability signature may be or may comprise heatmap data.

The heatmap data may quantify, for each of several pixels or voxels of the input data, how strongly the pixel or voxel affects the data analysis output for the input data.

Determining the explainability signature may comprise determining heatmap data using a Layer-wise Relevance Propagation (LRP).

Determining the explainability signature may comprise determining heatmap data using a Patternnet and Pattern-attribution method.

The input data may be medical image data.

The medical image data may be or may comprise MRI image data, CT image data, X-ray image data, US image data, thermography image data, scintigraphy image data, nuclear medicine functional imaging image data such as PET image data or SPECT image data, in particular scintigraphy of the brain.

The processing device or system may be a device or system for machine-aided diagnostics.

The data analysis output may be indicative of a normal or abnormal physical condition.

The data analysis model may be configured to process image data to identify the presence or absence of an abnormal neurological condition.

The data analysis model may be configured to process image data to identify a type of neurological condition.

The data analysis model may be configured to process image data of a subject's brain to identify the presence or absence of Parkinson's disease and/or Alzheimer's disease.

The data analysis model may be configured to process image data to identify the presence or absence of a cancer in the image data.

The data analysis model may be configured to process image data to identify a type of cancer in the image data.

The processing device or system may be arranged locally in a medical facility in which a medical imaging modality is provided to capture the image data.

The processing device or system may comprise a medical imaging modality coupled to the interface.

The medical imaging modality may comprise at least one of: a MRI system, a CT system, an X-ray system, an US system, a thermography system, a scintigraphy system, a nuclear medicine functional imaging system such as a PET or SPECT system, in particular a DaTSCAN system.

The method may further comprise providing, by a server, candidate AI models to at least a subset of a plurality of image processing devices or systems for validation.

The method may further comprise receiving, by the server, validation results from the subset of the plurality of data processing devices or systems.

The method may further comprise deciding, by the server, which one(s) of the candidate AI models is/are to be deployed to the plurality of data processing devices or systems based on the received validation results.

The method may further comprise deploying, by the server, the candidate AI model(s) selected based on the validation results to the plurality of data processing devices or systems.

The validation results may comprise or may be dependent on the cross-check data determined by the plurality of image processing devices or systems when using the candidate AI models.

The validation may be data-agnostic. The validation results received by the server may be independent of, and may not allow the server to infer, the input data to which the candidate AI models were applied by the plurality of image processing devices or systems.

The method may comprise performing data-agnostic distributed learning.

The method may comprise using data collected in databanks of the plurality of data processing devices or systems for distributed machine learning of a first AI model that processes the input data and/or a second AI model that processes at least the explainability signature.

The method may comprise transmitting, by at least one of the data processing devices or systems, updates to the first AI model that processes the input data and/or the second AI model that processes at least the explainability signature to one or several other data processing devices or systems and/or the server.

The updates to the first AI model that processes the input data and/or the second AI model that processes at least the explainability signature may be based at least one the cross-check data determined during field use by applying the second AI model to, inter alia, the explainability signature.

A processing device or system according to an embodiment comprises at least one interface to receive one or several candidate AI model(s) from a server, a storage system, and at least one integrated circuit. The at least one integrated circuit may be operative to perform a model validation for the one or several candidate AI model(s) and transmit a performance metric based on the model validation to the server.

The processing device or system may be an image processing device or system.

The at least one integrated circuit may be operative to apply the one or several candidate AI model(s) to data in a labeled dataset (such as medical image data with associated labels) stored locally at the processing device or system.

The at least one integrated circuit may be operative to determine the performance metric based on a performance of the one or several candidate AI model(s) when applied to the data in the labeled dataset.

The at least one integrated circuit may be operative to determine a data analysis result by applying the one or several candidate AI model(s) to the data in the labeled dataset, determining an explainability signature for a data analysis performed by applying a candidate AI model to the data in the labeled dataset, and generating the performance metric based at least on the explainability signature.

The at least one integrated circuit may be operative to input the explainability signature to a second AI model to generate the performance metric.

The at least one integrated circuit may be operative to use a labeled dataset comprising the data in the labeled dataset and a label in the labeled dataset that is dependent on cross-check data for performing AI model validation, the cross-check data being dependent on at least the explainability signature.

The at least one integrated circuit may be operative to apply a second AI (also referred to as cross-checking AI) to the explainability signature (and optional other inputs, such as the data input to the candidate AI model(s)) to determine the cross-check data.

The at least one integrated circuit may be operative to use the labeled dataset comprising the data in the labeled dataset and a label in the labeled dataset that is dependent on cross-check data to provide the validation result of the AI model validation to the server.

The data from the labeled dataset may be or may comprise medical image data.

The medical image data may be or may comprise MRI image data, CT image data, X-ray image data, US image data, thermography image data, scintigraphy image data, nuclear medicine functional imaging image data such as PET image data or SPECT image data, in particular scintigraphy of the brain.

The processing device or system may be a device or system for machine-aided diagnostics.

The processing device or system may be operative to generate an output that may be indicative of a normal or abnormal physical condition.

The candidate AI model(s) may be configured to process image data to identify the presence or absence of an abnormal neurological condition.

The candidate AI model(s) may be configured to process image data to identify a type of neurological condition.

The candidate AI model(s) be configured to process image data of a subject's brain to identify the presence or absence of Parkinson's disease and/or Alzheimer's disease.

The candidate AI model(s) may be configured to process image data to identify the presence or absence of a cancer in the image data.

The candidate AI model(s) may be configured to process image data to identify a type of cancer in the image data.

The processing device or system may be arranged locally in a medical facility in which a medical imaging modality is provided to capture the image data.

A server according to an embodiment is operative to provide one or several candidate AI model(s) to a set of data processing devices or systems for validation, receive validation results from the subset of the plurality of data processing devices or systems, and decide which one(s) of the candidate AI models is/are to be deployed to the plurality of data processing devices or systems based on the received validation results.

The server may be operative to deploy the candidate AI model(s) selected based on the validation results to the plurality of data processing devices or systems.

The validation may be data-agnostic. The validation results received by the server may be independent of, and may not allow the server to infer, the data to which the candidate AI models were applied by the plurality of image processing devices or systems.

The candidate AI model(s) may be a AI models for machine-aided diagnostics.

The candidate AI model(s) may be configured to process image data to identify the presence or absence of an abnormal neurological condition.

The candidate AI model(s) may be configured to process image data to identify a type of neurological condition.

The candidate AI model(s) be configured to process image data of a subject's brain to identify the presence or absence of Parkinson's disease and/or Alzheimer's disease.

The candidate AI model(s) may be configured to process image data to identify the presence or absence of a cancer in the image data.

The candidate AI model(s) may be configured to process image data to identify a type of cancer in the image data.

The server may be arranged off-site from the medical facilities at which the processing devices or systems are located.

A distributed computing system according to an embodiment comprises the server and a plurality of data processing devices or systems according to an embodiment.

A method according to an embodiment comprises the following steps performed by a processing device or system: receiving one or several candidate AI model(s) from a server; performing a model validation for the one or several candidate AI model(s); and transmitting a performance metric based on the model validation to the server.

The processing device or system may be an image processing device or system.

The method may comprise applying the one or several candidate AI model(s) to data in a labeled dataset (such as medical image data with associated labels) stored locally at the processing device or system.

The method may comprise determining the performance metric based on a performance of the one or several candidate AI model(s) when applied to the data in the labeled dataset.

The method may comprise determining a data analysis result by applying the one or several candidate AI model(s) to the data in the labeled dataset, determining an explainability signature for a data analysis performed by applying a candidate AI model to the data in the labeled dataset, and generating the performance metric based at least on the explainability signature.

The method may comprise inputting the explainability signature to a second AI model to generate the performance metric.

The method may comprise using a labeled dataset comprising the data in the labeled dataset and a label in the labeled dataset that is dependent on cross-check data for performing AI model validation, the cross-check data being dependent on at least the explainability signature.

The method may comprise applying a second AI (also referred to as cross-checking AI) to the explainability signature (and optional other inputs, such as the data input to the candidate AI model(s)) to determine the cross-check data.

The method may comprise using the data in the labeled dataset and a label in the labeled dataset that is dependent on cross-check data to provide the validation result of the AI model validation to the server.

The data from the labeled dataset may be or may comprise medical image data.

The medical image data may be or may comprise magnetic resonance imaging (MRI) image data, computer-tomography (CT) image data, X-ray image data, ultrasound (US) image data, thermography image data, nuclear medicine functional imaging image data such as positron emission tomography (PET) image data or single-photon emission computed tomography (SPECT) image data.

The processing device or system may be a device or system for machine-aided diagnostics.

The processing device or system may be operative to generate an output that may be indicative of a normal or abnormal physical condition.

The candidate AI model(s) may be configured to process image data to identify the presence or absence of an abnormal neurological condition.

The candidate AI model(s) may be configured to process image data to identify a type of neurological condition.

The candidate AI model(s) be configured to process image data of a subject's brain to identify the presence or absence of Parkinson's disease and/or Alzheimer's disease.

The candidate AI model(s) may be configured to process image data to identify the presence or absence of a cancer in the image data.

The candidate AI model(s) may be configured to process image data to identify a type of cancer in the image data.

The processing device or system may be arranged locally in a medical facility in which a medical imaging modality is provided to capture the image data.

A method according to an embodiment comprises the following steps performed by a server: providing one or several candidate AI model(s) to a set of data processing devices or systems for validation, receiving validation results from the subset of the plurality of data processing devices or systems, and deciding which one(s) of the candidate AI models is/are to be deployed to the plurality of data processing devices or systems based on the received validation results.

The method may comprise deploying the candidate AI model(s) selected based on the validation results to the plurality of data processing devices or systems.

The validation may be data-agnostic. The validation results received by the server may be independent of, and may not allow the server to infer, the data to which the candidate AI models were applied by the plurality of image processing devices or systems.

The candidate AI model(s) may be a AI models for machine-aided diagnostics.

The candidate AI model(s) may be configured to process image data to identify the presence or absence of an abnormal neurological condition.

The candidate AI model(s) may be configured to process image data to identify a type of neurological condition.

The candidate AI model(s) be configured to process image data of a subject's brain to identify the presence or absence of Parkinson's disease and/or Alzheimer's disease.

The candidate AI model(s) may be configured to process image data to identify the presence or absence of a cancer in the image data.

The candidate AI model(s) may be configured to process image data to identify a type of cancer in the image data.

The server may be arranged off-site from the medical facilities at which the processing devices or systems are located.

In any one of the embodiments, ANN(s) (such as CNN(s)) used to implement the data analysis (e.g., image analysis) and/or to process the explainability signature may use any one or any combination of various activation functions, such as hyperbolic tangent function, sigmoid function, rectified linear unit (ReLU), without being limited thereto.

Various effects and advantages are attained by the devices, systems, and methods according to embodiments. The devices, systems, and methods according to embodiments provide enhanced techniques suitable for image processing (without being limited thereto), which afford enhanced reliability and/or enhanced data privacy.

By implementing an automatic processing of an explainability signature by the processing device or system, inconsistencies can be detected. The automatic processing of the explainability signature may be used to generate a second class prediction, in addition to a first class prediction generated by a data analysis (that may be implemented as a first AI model), using the explainability signature (and additional data such as input image data) as inputs. An analysis result may be considered to be reliable only if the first and second class predictions match. Alternatively or additionally, the automatic processing of the explainability may be performed using a second AI model different form the first AI model and trained to detect errors in an image analysis, using the explainability signature.

By implementing a distributed architecture in which a server provides one or several AI model candidate(s) to several distinct processing devices or systems that each use their local labeled datasets for AI model validation, distributed model validation may be performed while ensuring data privacy. The local datasets and information included therein do not need to be provided to the server.

By implementing a distributed architecture in which several distinct processing devices or systems perform AI model training using their local labeled datasets (or even unlabeled datasets), distributed AI model training may be performed while ensuring data privacy. The local datasets and information included therein do not need to be provided to the server or the other processing devices or systems. Only updates to the AI model parameters (such as the activation functions or weights used) and/or AI model topology need to be exchanged between the distinct processing devices or systems.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of medical image analysis, the methods and devices described in detail below may be used in a wide variety of systems, including on-board vision systems of vehicles for driver assistance and/or autonomous driving.

The features of embodiments may be combined with each other, unless specifically noted otherwise.

According to embodiments of the invention, enhanced image processing devices, systems, and methods are provided.

According to embodiments, an "explainability signature" may be determined and processed. The "explainability signature" may be or may comprise data that indicates how an artificial intelligence, AI, model attains a certain result. The "explainability signature" may be or may comprise data that indicate which parts of input data (such as image data) that is being processed affect the output of the AI model more strongly or less strongly. The "explainability signature" may be or may comprise data that indicate how strongly different pixels or voxels of data processed by the AI model affect the output of the ML model more strongly or less strongly. The AI model may be a classifier. The classifier may be a binary classifier, without being limited thereto.

Figure 1:
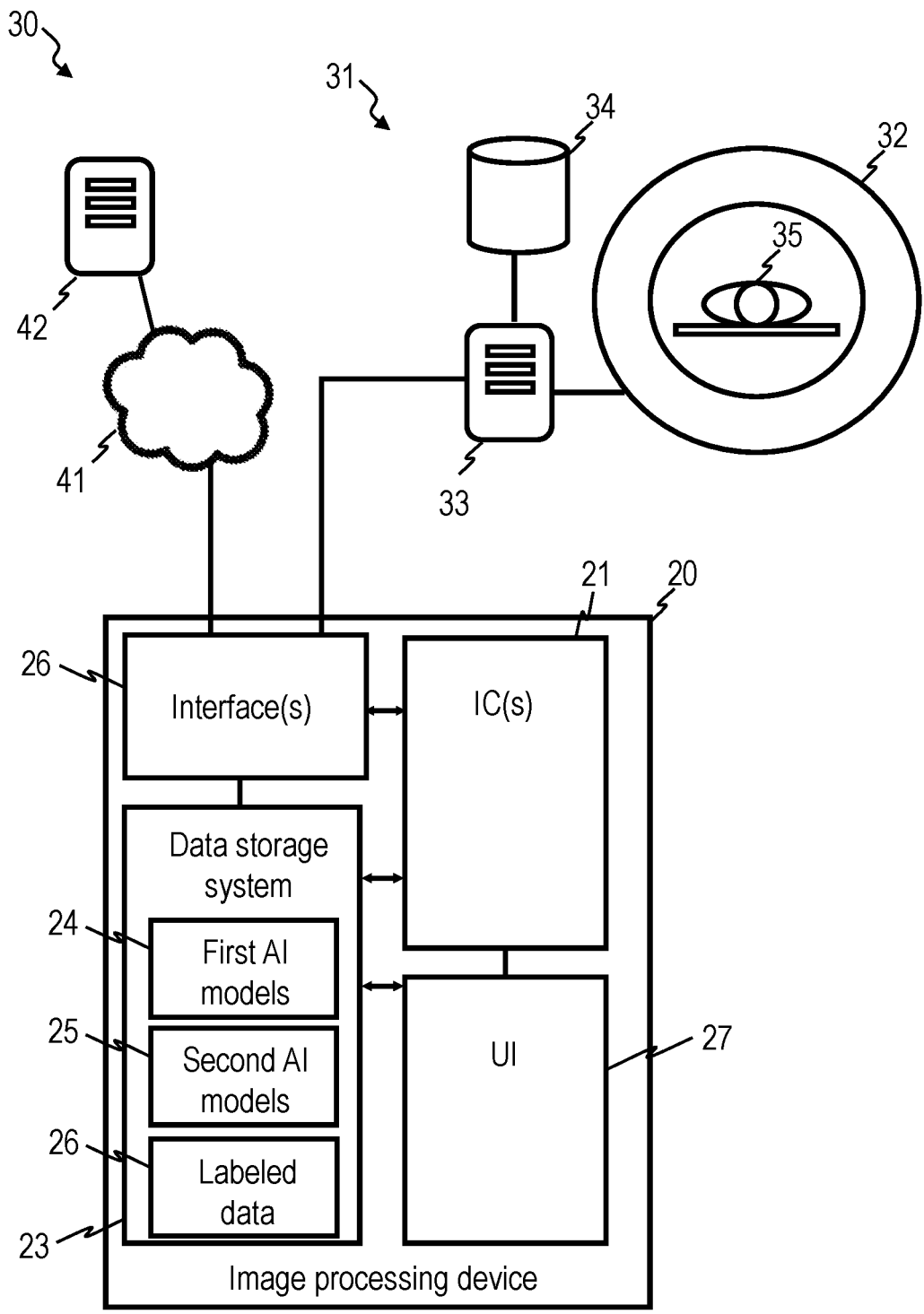
FIG. 1 is a schematic representation of a system comprising an image processing device or system.
Figure 2:
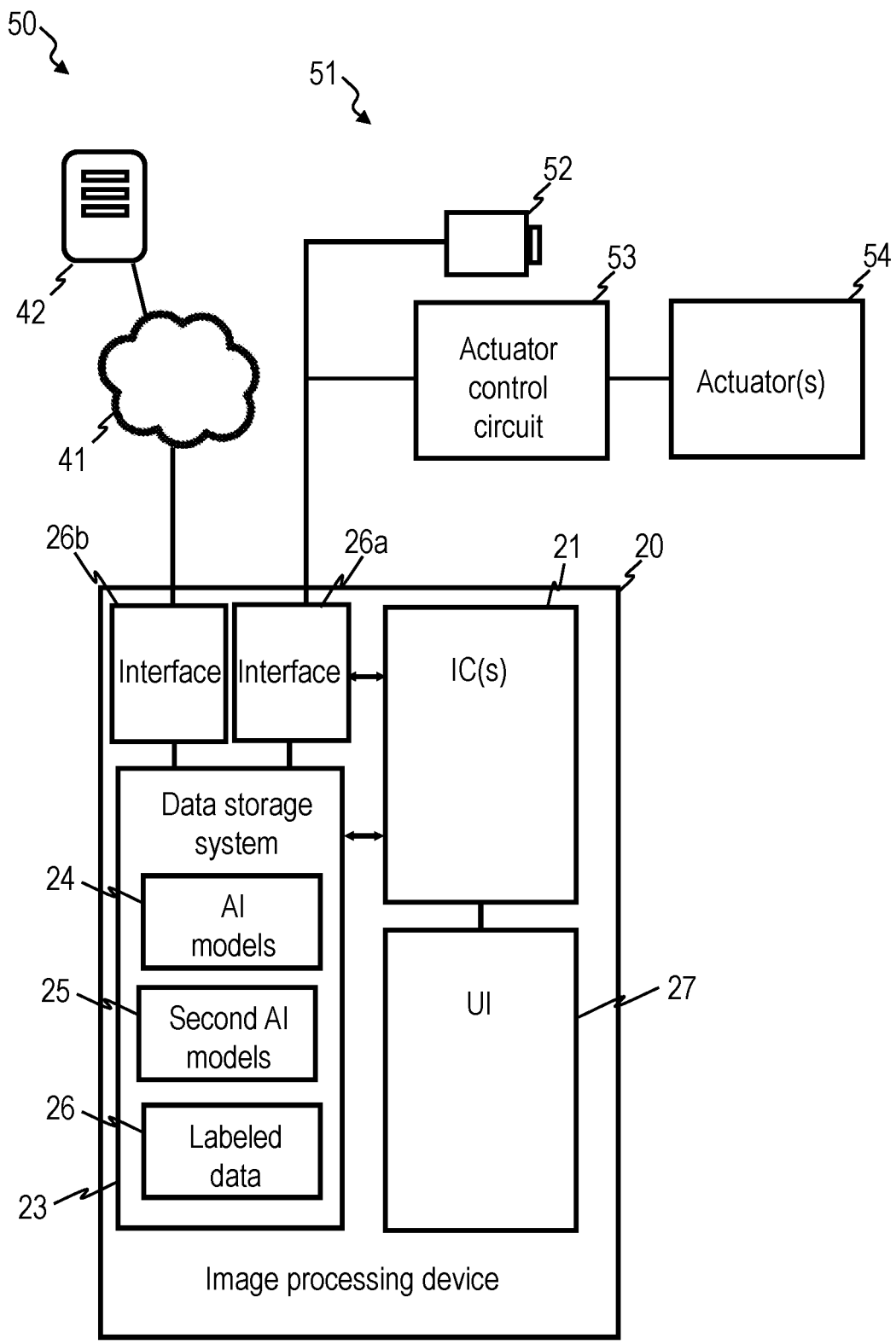
FIG. 2 is a schematic representation of a system comprising an image processing device or system.

FIGS. 1 and 2 show systems 30, 50 comprising an image processing device 20 or system according to an embodiment.

An image processing device 20 or system according to an embodiment comprises an interface 26 to receive image data, a storage system 24, and at least one integrated circuit 21. The at least one integrated circuit 21 may be operative to retrieve an image analysis model from the storage system 24. The at least one integrated circuit 21 may be operative to retrieve the image analysis model from one or several first artificial intelligence (AI) models 24 stored in the storage system. The at least one integrated circuit 21 may be operative to perform a data analysis that comprises applying the image analysis model to the image data to generate an image analysis output.

The image analysis model may be a classifier operative to classify the image data into one of a set of discrete classes. The classifier may have a binary output (such as: healthy/non-healthy or pedestrian/non-pedestrian object) or may classify the image data into more than two different classes.

The at least one integrated circuit 21 may be operative to generate an explainability signature for the image analysis. The at least one integrated circuit 21 may generate the explainability signature as a heatmap having a number of pixels or voxels with pixel or voxel values quantifying how strongly the respective pixels or voxels in the image data affect the result of the image analysis. A number of pixels or voxels in the heatmap may be equal to a number of pixels or voxels in the image data processed by the image analysis. The pixels or voxels in the heatmap may be in a one-to-one correspondence with the pixels or voxels in the image data analyzed by the image analysis model.

The at least one integrated circuit 21 may be operative to process the explainability signature (and optionally other inputs such as the image data and, further optionally, a confidence score of the image analysis provided by the image analysis model) to generate cross-check data indicative of a class prediction and/or a possible discrepancy in the data analysis. The at least one integrated circuit 21 may be operative to retrieve a cross-check AI model from one or several second AI models 25 stored in the storage system.

The second AI model 25 (also referred to as cross-check AI model (CCAI) herein) may receive at least the explainability signature as input. The second AI model 25 may also receive the image data as input. The second AI model 25 may optionally receive additional inputs, such as a confidence score of the image analysis provided by the image analysis model.

The second AI model 25 or second AI models 25 may have an input layer operative to receive at least the explainability signature.

The second AI model 25 or second AI models 25 may have an output layer operative to provide a cross-check output. The cross-check output may be indicative of a discrepancy or inconsistency between the results of the first AI model 24 and the explainability signature.

The first and second AI models 24, 25 may be pre-trained when stored in the data storage system 23. The first and second AI models 24, 25 may have different AI model configurations. For illustration, the first AI models 24 may be an artificial neural network (ANN), in particular a convolutional neural network (CNN). The second AI models 25 may include K-means clustering or ANNs, optionally in combination with principal component analysis (PCA) and/or histogram analysis.

The image analysis model selected from the first AI models 24 may be continued to be trained during field use of the image processing device. Labeled data 26 generated in preceding image analyses may be used for continued training of the first AI models 24 during field use, by the IC(s).

The CCAI model, or more generally the second AI models 25, may be continued to be trained during field use of the image processing device. Unsupervised learning or supervised learning may be used. The labeled data 26 stored locally in the storage system 23 may be used to train the CCAI model or the second AI models 25 during field use.

The objectives for which the first AI model 24 used as image analysis model and the second AI model 25 used as CCAI model are trained may be the same. Both may be trained to perform an image classification task, with the CCAI model using the explainability signature in combination with the image data and, optionally, the confidence score of the first AI model.

The objectives for which the first AI model 24 used as image analysis model and the second AI model 25 used as CCAI model are trained may be different. The first AI model 24 may be trained to perform an image classification task responsive to receipt of the image data. The second AI model 25 may be trained to detect a potentially erroneous output from the first AI model 24, by processing the explainability signature, the image data and, optionally, the confidence score of the first AI model.

The at least one integrated circuit 21 may be operative to initiate a control action that depends on the cross-check data.

The control action that depends on the cross-check data may be or may comprise causing a label that is dependent on the cross-check data to be stored in association with the input data in the storage system 23. The control action may comprise controlling a storage system controller and/or a database management system (when a databank associated with the image processing device 20 is implemented as a database).

The control action that depends on the cross-check data may be or may comprise combining the image analysis output with the cross-check data to generate a consolidated image analysis result. For illustration, majority or voting techniques may be used when the CCAI model also performs image classification. An image classification may be considered reliable only if the classification of the first AI model 24 used as image analysis model and of the second AI model 25 used as CCAI model are in agreement. When the CCAI model is trained to detect a potentially erroneous output from the first AI model 24, an image classification performed by the first AI model used as image analysis model may be considered reliable only if the CCAI does not detect a potentially erroneous output. The consolidated image analysis result may be output via a user interface (UI) 27.

The control action that depends on the cross-check data may be or may comprise issuing a control signal to an actuator control circuit 53 to control at least one actuator 54. majority or voting techniques may be used when the CCAI model also performs image classification. The outputting of actuator control signals may be initiated selectively depending on the image analysis result and depending on whether the image analysis result is considered reliable. The image classification may be considered reliable only if the classification of the first AI model 24 used as image analysis model and of the second AI model 25 used as CCAI model are in agreement. When the CCAI model is trained to detect a potentially erroneous output from the first AI model 24, an image classification performed by the first AI model used as image analysis model may be considered reliable only if the CCAI does not detect a potentially erroneous output.

The control action that depends on the cross-check data may be or may comprise flagging image analysis results that require operator attention on the UI 27. When the second AI model 25 used as CCAI model also performs an image classification with the classes as the first AI model 24 used as image analysis model, an image analysis output of the image analysis may be flagged if the classifications of the CCAI model and of the image analysis model are not in agreement. When the second AI model 25 used as CCAI model is trained to detect potentially incorrect image analysis outputs, an image analysis output of the image analysis may be flagged if the output of the CCAI model indicates that there is a potential inconsistency between the explainability signature and the image analysis output in consideration of the image data.

According to embodiments of the invention, an image processing device or system (irrespective of whether it uses the CCAI) may be operative for distributed AI model validation and/or distributed data-agnostic AI model training.

The image processing device 20 or system may have an interface 26, 26a for communicative coupling to a server 42 and/or other image processing devices or systems via a wide area network (WAN) 41.

The image processing device 20 or system may be operative to receive one or several candidate AI model(s) for the first and/or second AIs 24, 25 from the server 42. The image processing device 20 may be operative to perform a model validation for the one or several candidate AI model(s) and to transmit a performance metric based on the model validation to the server 42.

The image processing device 20 or system may be operative to apply the one or several candidate AI model(s) to images in a labeled dataset 26 (such as medical image data with associated labels) stored locally at the image processing device 20 or system. The performance metric may be determined based on a performance of the one or several candidate AI model(s) when applied to the images in the labeled dataset 26.

When the image processing device 20 or system implements a CCAI, the performance metric may be dependent on the cross-check data generated by the CCAI.

Responsive to transmitting the performance metric, the image processing device 20 or system may receive a new AI model or an AI model update from the server 42.

The server 42 may be operative to deploy the candidate AI model(s) to at least a subset of the image processing devices 20 or systems communicatively coupled to the server 42. The server may receive the performance metrics, may evaluate the performance metrics to identify candidate AI model(s) that outperform the other candidate AI model(s), and may instruct the plurality of image processing devices 20 or systems communicatively coupled to the server 42 to use the selected AI model(s) 20. This may be done by deploying new AI model(s) (e.g., when the topology of an ANN or other hyperparameters of the AI model(s) change) or updates (e.g., when only weights of the ANN or other parameters that do not affect the AI model topology need to be changed) to the image processing devices 20 or systems.

Distributed AI model validation may involve only a subset of the image processing devices 20 or systems communicatively coupled to the server 42. Different subsets of image processing devices 20 or systems may be tasked with evaluating different candidate AI model(s).

Alternatively or additionally to performing distributed AI model validation, the image processing device 20 or system may be operative to perform distributed AI model training. The image processing device 20 or system may perform ML for the AI model used for image analysis (i.e., the AI model that receives the image data as input) and/or the CCAI model used for processing (inter alia) the explainability signature. The image processing device 20 or system may transmit updated AI model parameters (such as different weights or other parameters of an ANN or parameters of a K-means clustering technique) to one or several additional image processing devices or systems for use. The image processing device 20 or system may receive AI model parameters (such as different weights or other parameters of an ANN or parameters of a K-means clustering technique) determined by one or several additional image processing devices or systems from these one or several additional image processing devices or systems and may use the received AI model parameters, optionally in combination with results of ML performed locally at the image processing device 20 or system itself, for updating parameters of the AI that implements the image analysis and the CCAI that processes (inter alia) the explainability signature.

Distributed model validation and/or distributed ML may be performed in a data-agnostic manner. The server 42 receives performance metrics which may not convey any information on the image data used to determine the performance metrics. Only the image analysis device 20 or system that determines the performance metric for AI model validation and/or that determines updates to AI model parameters by performing in-field-use ML is aware of the image data used, while the server 42 and all other image analysis devices 20 or systems that participate in the information sharing do not receive any information on the image data. Thus, data privacy is enhanced.

The image analysis device 20 or system may be used in various applications, such as machine-aided diagnostics.

FIG. 1 schematically shows an image analysis device 20 or system that is coupled to or comprises a medical imaging modality 32. The medical imaging modality 32 may be operative to position a patient 35 on, e.g., a patient table. The medical imaging modality 32 may comprise or may be at least one of: a MRI system, a CT system, an X-ray system, an US system, a thermography system, a nuclear medicine functional imaging system such as a PET or SPECT system.

A reconstruction computer 33 may be coupled to the medical imaging modality 32 to reconstruct an image from the data acquired by the medical imaging modality 32. The reconstructed images may be stored locally in a storage device 34. The reconstruction computer 33 and/or storage device 34 may be provided separately from the image analysis device 20 in a dedicated image acquisition subsystem 31, or the functions of the reconstruction computer 33 and/or storage device 34 may be incorporated in the image analysis device 20.

The image analysis device 20 or system may be used in automated asset control or operator assistance, e.g., in autonomous driving or driver assistance.

FIG. 2 schematically shows an image analysis device 20 or system that is coupled to or comprises a vehicular onboard system 51 having a camera 52. The image analysis device 20 or system may be installed onboard a vehicle. The image analysis device 20 or system may have a wired interface 26a for receiving image data from the camera 52 and a wireless interface 26b for communicating with the server 42 and/or onboard systems of other vehicles. The results of the CCAI may be used in automatic control of actuator(s) 54 and/or for outputting driver assistance information via the UI 27.

While a vehicular onboard vision system is schematically illustrated in FIG. 2, the image analysis device 20 or system may also be used for other purposes, such as industrial asset monitoring (e.g., by controlling actuators of an industrial plant based on CCAI output).

Embodiments of the invention address shortcomings associated with the inherently black-box behavior of conventional AI approaches for image analysis, such as (i) the fact that it is difficult to understand why a system came to produce a certain output, and (ii) the risk that an AI system draws an incorrect conclusion. The image analysis device 20 or system addresses these issues using (i) explainability technology in order to enable transparency in the AI decision making, and (ii) an intelligent mechanism to cross-check the output of the AI image analysis, which in practice significantly reduces the general risk of an incorrect output, as further demonstrated herein.

AI and ML: As used herein, AI refers to the ability of a computing system to perform complex tasks appearing intelligent. ML refers to the study of computer-implemented processes that are capable of self-learning, which are typically used in order to create AI systems. Exemplary methods of AI and ML are ANNs, which consists of a number of layers with many inter-connected computing nodes, known as neurons. Each neuron performs a simple non-linear transformation of its input, parameterized by a weight and bias matrix. An ANN is associated with a particular architecture which defines in particular the number of neurons, and their connectivity topology, e.g. Multi-Layer Perceptron (MLP) which have fully-connected layers and Convolutional Neural Networks (CNN) with sparsely connected convolutional layers. An ANN with a specific associated architecture, together with the values of the weights and biases for all neurons (and the values of any other parameters), is referred to as an AI model. ANNs can through a training process efficiently learn features from data.

Training: The training process of an ANN requires a dataset D, which, in the case of supervised training, includes annotations (e.g. the correct class of the input) of the property to be concluded the AI model. Training by utilizing such annotations is referred to as supervised learning, as opposed to unsupervised which does not. The supervised learning training process consists of randomly sampling mini-batches from D, and iteratively adjusting the ANN model to perform better on each such mini-batch. In more detail, a variant of the optimization algorithm Stochastic Gradient Descent (SGD) is used to minimize a differentiable error function which quantifies the performance of the ANN model on a batch of data.

Inference: A successfully trained AI model can be used for inference, i.e. an input can be given to the model, and it will produce an output which is similar to the corresponding annotation for that input, e.g. the class (car, pedestrian, decease category, etc.) of an input image.

Image analysis with AI: AI, such as ANN, can be used for image analysis. Convolutional architectures (CNNs) are particularly suitable due to their ability to analyze images with high accuracy. AI for medical image analysis may be used for machine-aided diagnosis applications.

Explainability: Explainability is dedicated to developing techniques that enable increased understanding of how an AI came to produce a particular output. Such methods hence enable a level of transparency of an AI-powered system, which is much needed in safety-critical applications, such as medical imaging or asset control. Explainability techniques may take as input (i) the state of the model, (ii) a particular input, and (iii) the resulting output, and generate a signature which can be used to enable increased understanding of how the output was generated by the AI, i.e. explaining the decision. Devices 20 according to embodiments partially or fully automatize the process of interpreting an explainability signature. Explainability signatures may be determined using techniques such as Layer-wise Relevance Propagation (LRP) (e.g., using the techniques of W. Samek et al., "Explainable AI: interpreting, explaining and visualizing deep learning", volume 11700. Springer Nature, 2019) or Patternnet and Pattern-attribution methods (e.g., using the techniques of P. J. Kindermans et al, "Learning how to explain neural networks: Patternnet and pattern attribution", arXiv preprint arXiv: 1705.05598, 2017). Given a sample x and an AI model trained for classification, these methods generates a heatmap that visualizes the features of the input x which were relevant for the output of the model. LRP is particularly useful in AI-assisted systems, since it enables more informed and possibly accurate decisions.

The image analysis device 20 or system may have the following functions or features:

Input: Image data to be analyzed are received, potentially together with the domain, specifying which AI model to use (e.g. one which looks for a particular disease, or one which classifies objects commonly observed in traffic).

Pre-processing: transform input to extract features and facilitate more effective subsequent AI-driven analysis steps Analysis: Use AI component for inference, i.e. analyze (classify, predict, etc.) based on the pre-processed input data Explain: Utilize an AI explainability technique that corresponds to the selected AI model to produce a signature (e.g. heatmap), clearly visualizing for user the features which were relevant for the AI-produced output. This accommodates for further informed and reliable decision-making by subsequent systems which use this information (such as the CCAI module, to be introduced below).

A local databank is growing over time, which contains historical inputs together with corresponding annotations/labels (that may be generated by a human operator or fully automatically based on the cross-check data of the CCAI). The databank can for instance consist of patient data, such as medical images, which have been annotated with diagnosis.

Maintenance/update/upgrade: A central AI model server, which may be maintained by the device provider, may send updated AI models to the device, which are downloaded and verified on the local collected dataset. New AI models, specialized at new specific domains of data (such as an additional type of disease to diagnose) may be acquired in this way, according to some subscription agreement.

Distributed validation: In order to provide reliable validated model updates on the central update server, the model candidates are, prior to deployment, transmitted as candidates to a number of local devices that are in operation, and that have collected sufficient data. Local devices can validate the new candidate model on the local datasets, and transmit the results back to the central update server, which can then aggregate the measurements, and compute a reliable performance estimate of the candidate.

Figure 3:
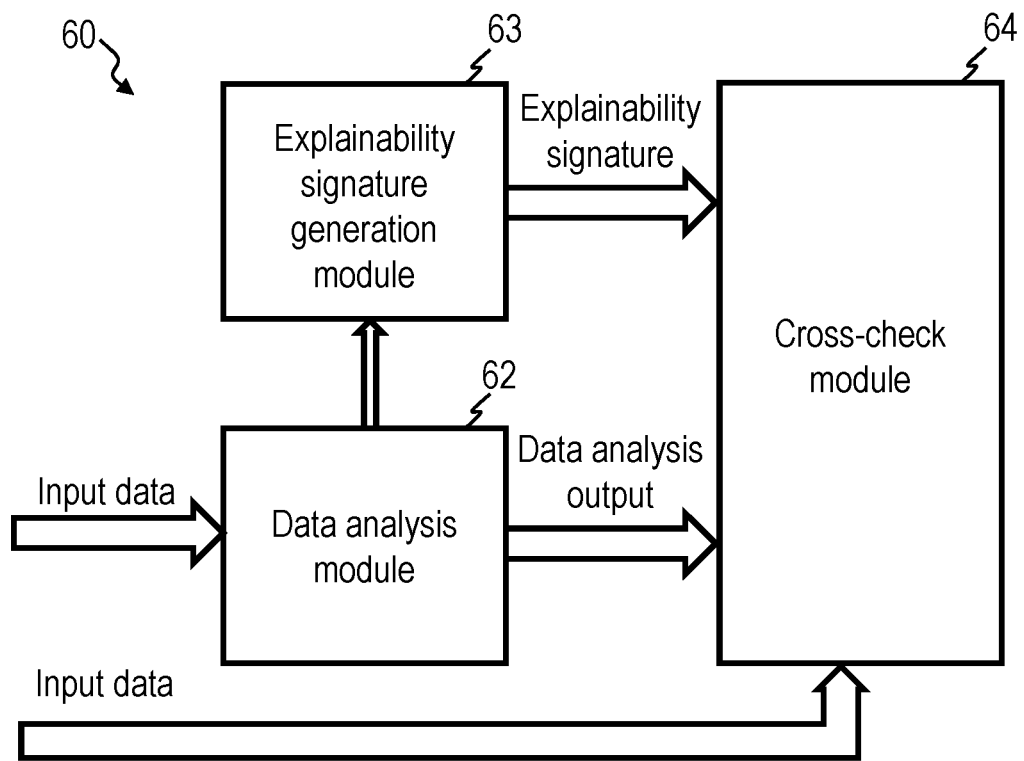
FIG. 3 is a block diagram of an image processing device or system.
Figure 5:
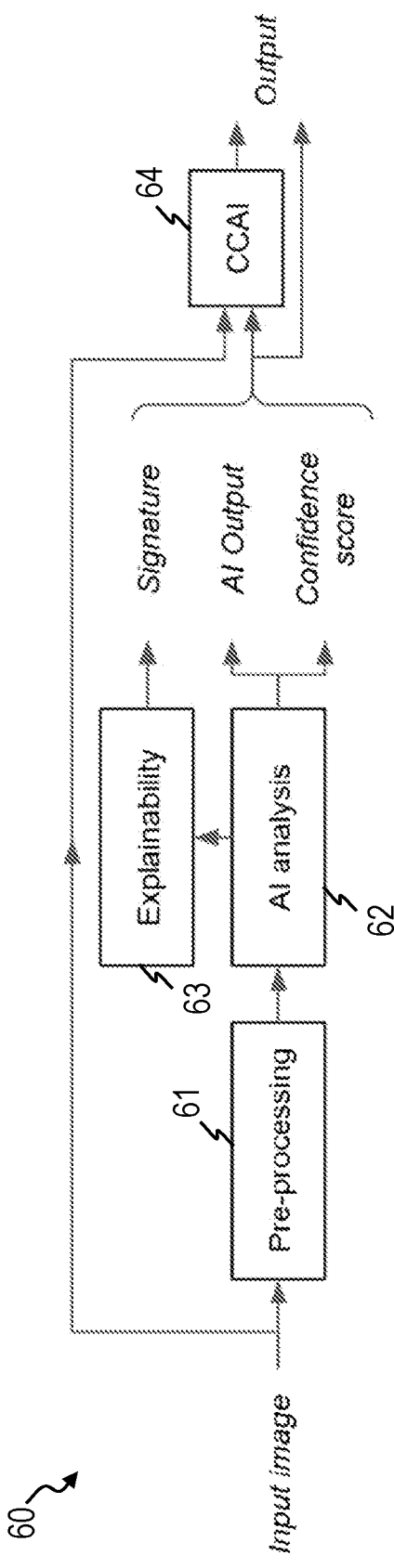
FIG. 5 is a block diagram of an image processing device or system.
Figure 6:
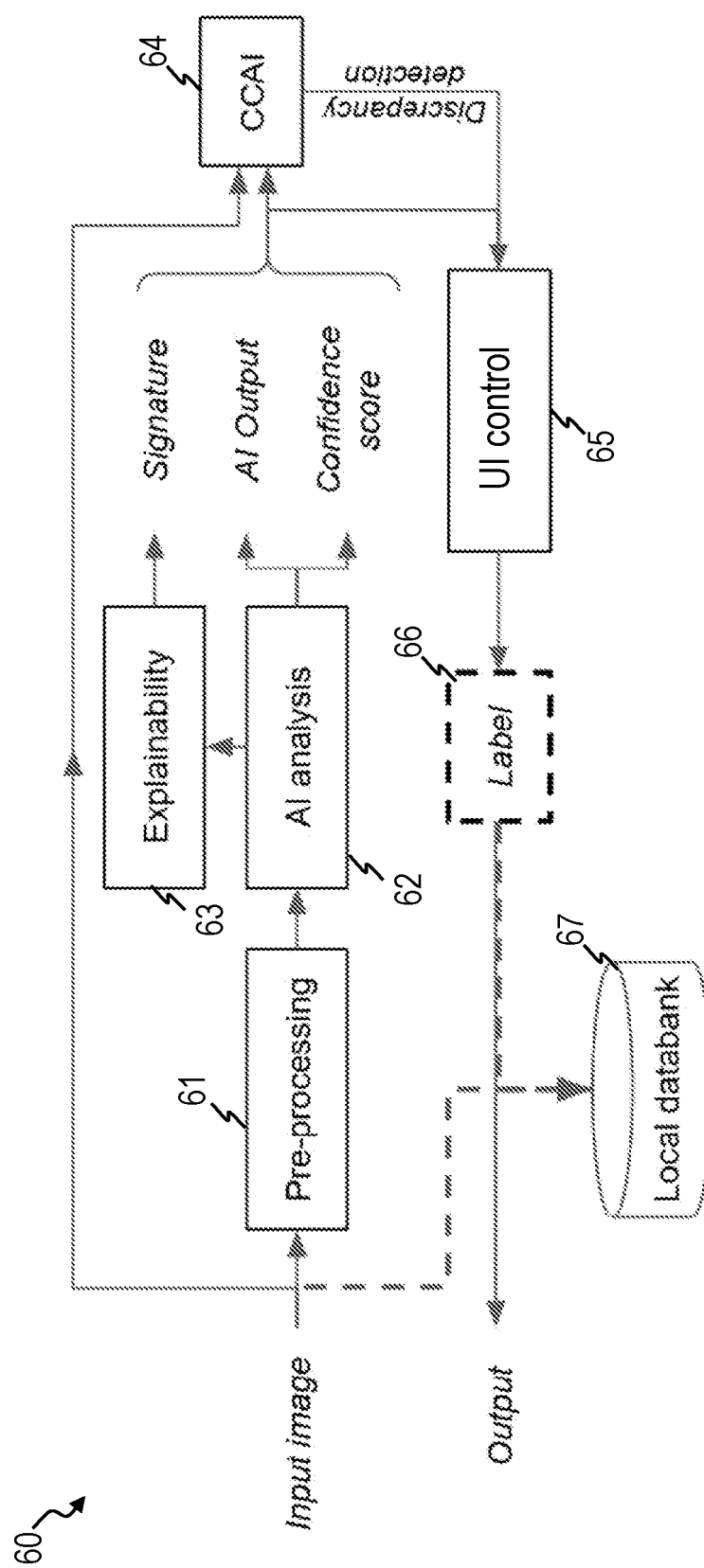
FIG. 6 is a block diagram of an image processing device or system.

Knowledge aggregation: Individual devices can run ML methods locally, and learn based on the locally collected databank. The learned models, or just model updates, can then be transmitted to and aggregated by the central model server, or other deployed devices. This can be done without transmitting any of the collected data, which is suitable in applications where data integrity is critical, such as in medical applications FIGS. 3, 5, and 6 show functional block diagrams 60 of a data processing device 20, system, or method that may be used for image analysis.

A data analysis module 62 may be executed by the IC(s) 21 to perform a data analysis. This may include applying a first AI model to input data. The input data may be image data. The first AI model may be an ANN, in particular a CNN. A number of nodes and a number of layers of the ANN may be dependent on the number of pixels or voxels in the image data. The first AI model may be a classifier that outputs a classification result (e.g., indicating normal and abnormal conditions, disease classification, etc.).

An explainability signature generation module 63 determines an explainability signature for the data analysis (e.g., for the image analysis). The explainability signature may be a heatmap having pixels or voxels in correspondence with pixels or voxels of the input data, with pixel or voxel values of the explainability signature quantifying the importance of the respective pixel or voxel for the decision-making process of the data analysis module 62. The explainability signature generation module 6 may process the state of the first AI model (e.g., weights or other parameters or a CNN), the input data, and the data analysis output provided by the data analysis module to determine the explainability signature. The explainability signature generation module 63 may use Layer-wise Relevance Propagation (LRP) (e.g., using the techniques of W. Samek et al., "Explainable AI: interpreting, explaining and visualizing deep learning", volume 11700. Springer Nature, 2019) or Patternnet and Pattern-attribution methods (e.g., using the techniques of P. J. Kindermans et al, "Learning how to explain neural networks: Patternnet and pattern attribution", arXiv preprint arXiv: 1705.05598, 2017) to determine the explainability signature.

Figure 4:
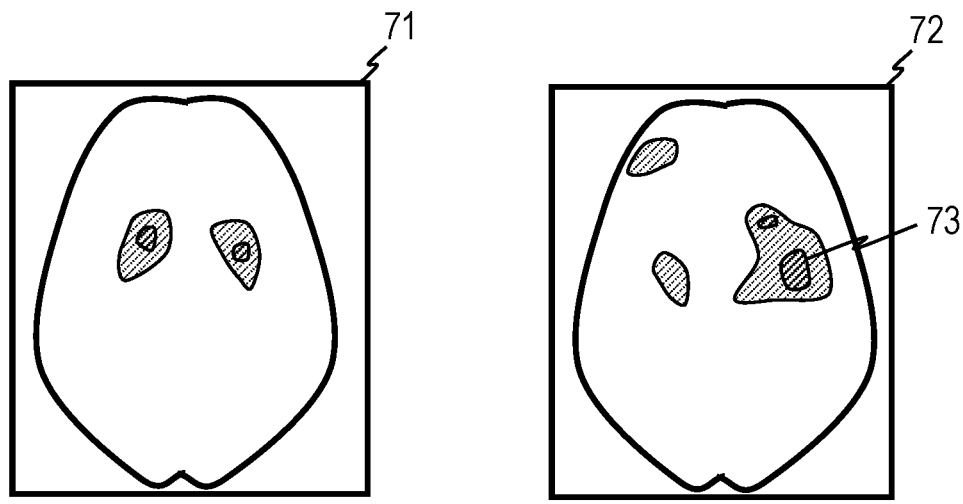
FIG. 4 shows image data and an explainability signature.

FIG. 4 shows exemplary image data 71 (such as a layer of a medical image of a subject's brain) and heatmap data 72 generated by the explainability signature generation module 63. Pixel or voxel values in the heatmap data 72 quantify the features of the input data of the data analysis module 62 which were relevant for the output of the data analysis module 62. For illustration, pixel(s) or voxel(s) 73 with higher pixel or voxel values in the heatmap 72 may indicate that these regions are more important for the data analysis output, given the respective image data 71.

A cross-check module 64 receives the explainability signature, the input data (e.g., an input image), and the data analysis output and processes this information to determine whether the data analysis output is reasonable when considering the image data and the explainability signature. This may be done in various ways, as will be explained in more detail below. The cross-check module 64 may use a second AI model that may be trained to perform the same classification task as the first AI model (using, however, a larger number of inputs, namely at least the explainability signature and the data analysis output in addition to the input data). The second AI model may alternatively be trained to detect cases in which the data analysis output does not appear to be correct in view of the input data and the explainability signature.

The output of the cross-check module 64 may be used in various ways, e.g., for selectively initiating storage of image data and an associated label, for flagging image data and/or for controlling actuators.

FIG. 5 is a block diagram visualizing a data processing pipeline in the image analysis device capable of fully automatically checking the explainability signature. The AI analysis outputs generated by a data analysis module 62 are passed on, in conjunction with the output of the CCAI, to a surrounding/subsequent system in order to take a final decision. In this way, an additional layer of security provided by an human inspection of the explainability signature is automated by the CCAI module, and the surrounding/subsequent system can take this additional information into account. For instance, in a safety-critical application (e.g. autonomous driving) a decision can require consensus between the AI Analysis and the CCAI outputs. A voting scheme may be used, e.g., in less critical applications.

FIG. 6 is a block diagram visualizing a data processing pipeline in the image analysis device. The AI analysis outputs generated by a data analysis module 62 in combination with with the CCAI module provides a reliable base of information in order to assist decisions in computer-aided decision making (e.g., for assisting a medical doctor in machine-aided diagnostics). A UI control operation 65 may be performed automatically. An input received from a human operator via the UI may be used to store a label 66 together with corresponding Input image, into a labeled dataset in a databank 67, thereby building labeled datasets. Alternatively, the label may be generated automatically based on the CCAI output.

As shown in FIGS. 5 and 6, an optional pre-processing module 61 may be used. The pre-processing module 61 may performs operations that facilitate features extraction and facilitate more effective subsequent AI-driven analysis steps. For illustration, the pre-processing module 61 may perform a Fourier transform in 2D or 3D, edge detection, PCA, or other pre-processing steps.

An image analysis device 20 or system uses AI analysis in conjunction with explainability for more informed and reliable decisions, and with a secondary system (the CCAI) for cross-checking the performance of the first, using explainability technology. The image analysis device 20 or system provides various benefits in fully automated processes and in partially automated processes. A human operator may benefit from the additional information provided by the proposed image analysis device 20 or system as a basis for his/her decisions. In a fully autonomous system, without human intervention, the image analysis device 20 or system provides a richer set of information for subsequent systems to use for more reliable decisions making (e.g. through voting, consensus, etc.).

Implementations of the different functional components of the image analysis device 20 or system will be described in more detail below.

Pre-Processing

The pre-processing module may include a pre-processing pipeline which is relevant for the particular application and AI model. The pipeline may differ for the different AI models used by the AI analysis 62 on the same device 20. The pre-processing pipeline may also be subject to updates from the central update server 42. Examples of general pre-processing steps include PCA, histogram analysis, or other dimensionality reduction. In image analysis specifically, such steps may include intensity or spatial normalization, among others.

Image Analysis with AI

The device 20 is equipped with the AI analysis module 62, which contains an AI model (e.g., an ANN model) pre-trained for one or several certain task(s). The AI analysis module 62 takes as input the pre-processed image, and provides the output (e.g. estimated class, diagnosis, etc.). The AI analysis module 62 may output a confidence score which indicates the reliability of the output, to be used in subsequent decision by human operator (e.g. medical doctor), as well as in the CCAI module 64.

Explainability

The explainability module 63 monitors the performance of the AI analysis module, and complements its output with an additional signature which is useful in subsequent steps for understanding the output of the AI analysis module (e.g. a heatmap that highlights relevant features in the input image, useful for detecting erroneous output from the AI analysis module). The explainability module takes as input any needed aspects of the AI analysis module, such as the Input image, pre-processed input, AI model, AI output, Confidence score etc.

CCAI

The CCAI module 64 constitutes a secondary system which takes as input (i) the input image (ii) the AI output provided by the AI analysis module 62 and, optionally, confidence score as well as (iii) the signature generated by the explainability module 63. The CCAI module 64 may take as input other signals available for measurement in the system. The CCAI module 64 adds an additional layer of analysis. The CCAI module 64 generates cross-check data as output which indicates the detection of (and other information regarding) a discrepancy in the system, e.g. that the explainability signature did not appear consistent with the output of the AI analysis module in some way. The cross-check data may also indicate systematic issues of the AI model used by the AI analysis module 62 (or other aspects of the whole system) such as ML-related ones (under/overfitting, concept drift, etc.). The CCAI module 64 can be AI-driven with supervised or unsupervised learning, or may employ methods such as rule-based decision making, statistical feature detection, threshold-engineering, system identification, etc. for analyzing its inputs.

The CCAI module 64 complements the AI analysis module 62 by performing a cross-check of its output, aimed to detect discrepancies in its performance. Such discrepancies may include erroneous classification or predictions. The CCAI module 64 has available as input all information available to the AI analysis module. In addition, it has available other data in the system, including primarily the explainability signature. The signature is generated based on the state and output of the AI analysis module, highlighting features in the input which were relevant for deciding on the output, constituting a compact encoding of critical features in the input. Part of the task of the CCAI module 64 is to learn, identify, and detect abnormalities or anomalies in this information. The CCAI module 64 has the ability to detect discrepancies in the performance of the AI analysis module 62 as well as increase the reliability of its output by confirming its correctness. This is primarily due to (i) an increased data as basis for analysis and (ii) that the CCAI module 64 is trained for this task specifically.

The CCAI module 64 constitutes a further step towards automatizing the supervision and intervention in AI-driven systems. The CCAI module 64 strengthens the performance of such systems by introducing additional check-points, which together provides a richer informational basis for more reliable decision making. The CCAI module 64 can follow several different design patterns, multiple of which may be utilized within the same system. This will be explained in more detail in the following.

The CCAI module 64 may use a (second) AI model that is associated with, i.e., linked to, the AI model used by the AI analysis module 62. Different AI models used by the AI analysis model for different diagnostic or non-diagnostic image analyses tasks may each have an associated section AI model for cross-checking their performance.

The (second) AI model used in the CCAI module 62 of the image analysis device 20 or system may be pre-trained prior to its field use, for example at the server 42. The image analysis device 20 or system may continue training the (second) AI model during field use.

The (second) AI model used in the CCAI module may be trained to fulfill different tasks. For illustration, the (second) AI model may be configured, by virtue of its training, to perform one or both of the following tasks:

a. Same (classification) task as the associated (first) AI model used by the AI analysis module 62, while being provided with additional input (e.g. the signature)

b. Detecting erroneous output from the AI analysis module.

The first option (a) means that the CCAI module 64 repeats the task of the AI analysis module 62, however with additional information as input, including primarily the explainability signature, as well as optionally other system data relating to the performance of AI analysis module 62. The modules 62, 64 may then be used in combination in e.g. a voting scheme, where their outputs as well as their respective confidence scores are taken into account. In a safety-critical application, a possible setup is to require consensus of the modules in order to provide a system final output, or decision, also possibly taking the confidence scores into account.

The second option (b) entails a CCAI module 64 which is trained specifically for detecting when the output of the AI analysis module 62 is incorrect, e.g. an erroneous classification or prediction. The CCAI module 64 may provide a binary output that indicates whether the CCAI module 64 considers the AI analysis module 62 to provide a correct or incorrect data analysis output. As an example, the output of the CCAI module 64 may be 0 if it deems the AI analysis module 62 to be correct, and 1 if it concludes that the AI analysis module 62 made a mistake, taking into account the additional input available to the CCAI module 64. Similarly to the first option (a), this option allows voting scheme, as well as consensus setups.

The above options may be used in combinations within the same system.

The CCAI module 64 is modular in its application and setup. It is also modular in the sense that it allows various underlying methods for performing its tasks. In particular, both supervised and unsupervised learning methods are compatible with the proposed system. Examples of specific techniques which have been used successfully in empirical tests include:

ANNs and Deep Neural Networks (DNNs), including Multi-layer Perceptrons as well as CNNs. These are examples of how supervised learning techniques are successfully used within the proposed system.

K-means clustering, which is a distance-based clustering method, which does not require labels, hence constituting an unsupervised learning method.

Combinations of CCAI modules with different underlying methods may be used in voting or consensus schemes.

For illustration, a first CCAI module based on an ANN and a second CCAI module based on K-means clustering may be used in combination to implement an even more reliable detection of cases in which the output of the AI analysis output is considered to be incorrect. The different first and second CCAI modules may be trained with the same or different tasks (e.g., tasks (a) and (b) described above).

Local Databank

Data is gradually collected over time, and is stored in the databank 67 which is provided locally at the image processing device 20 or system. In partially automated schemes, a human operator may take part of the information provided by the image processing device 20 or system, such as the input itself, the pre-processed input, the AI analysis output, confidence score, explainability signature, etc. The human operator, typically a field expert in the application domain, may then take an informed decision, which either agrees with the AI output, or contradicts it. Either way, a label is provided which may be stored in the databank together with the corresponding input. This results in a continuously growing labelled dataset.

The data is local, and does not need to be shared with any external party, allowing usability in applications where data integrity is critical. A distributed system of all deployed devices (FIG. 13, which will be described in detail below) includes a plurality of local databanks. These local databanks may be used for (i) distributed model validation and (ii) distributed ML, as described in more detail below.

Figure 7:
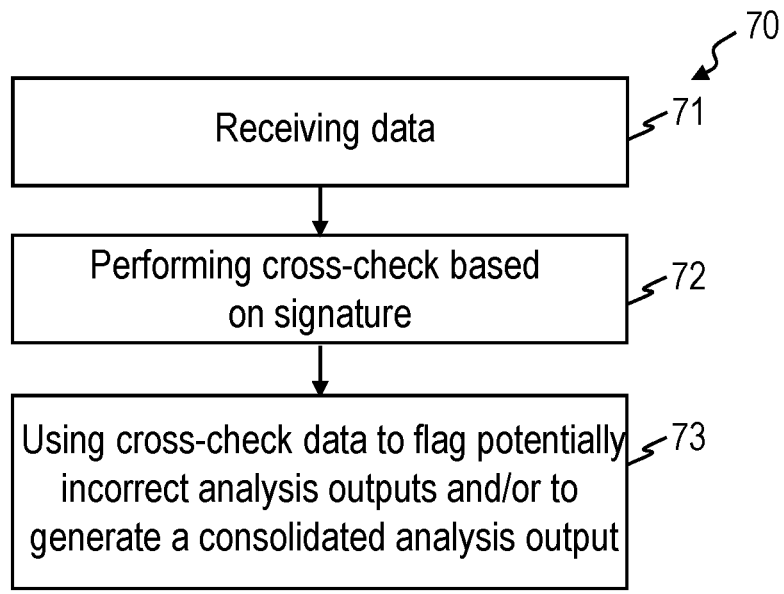
FIG. 7 is a flow chart of a method.

FIG. 7 is a flow chart of a method 70 that may be performed by the image analysis device 20 or system using the cross-checking module 62.

At step 71, image data is received.

At step 72, the image analysis device 20 or system performs a cross-check of the image analysis performed by an image analysis module of the image analysis device 20, using, inter alia, an explainability signature of the image analysis as input. Cross-check data is generated, which may be data indicating whether or not the image analysis module is believed to be incorrect and/or providing a further classification of the image data into the same set of classes as the image analysis module, but using the explainability signature as (additional) input.

At step 73, the cross-check data may be used to flag potentially incorrect image analysis results, to generate a consolidated analysis result (using, e.g., voting techniques that may take into account confidence scores of the image analysis module and the CCAI), and/or to otherwise combine the cross-check data with the image analysis output provided by the image analysis module.

Figure 8:
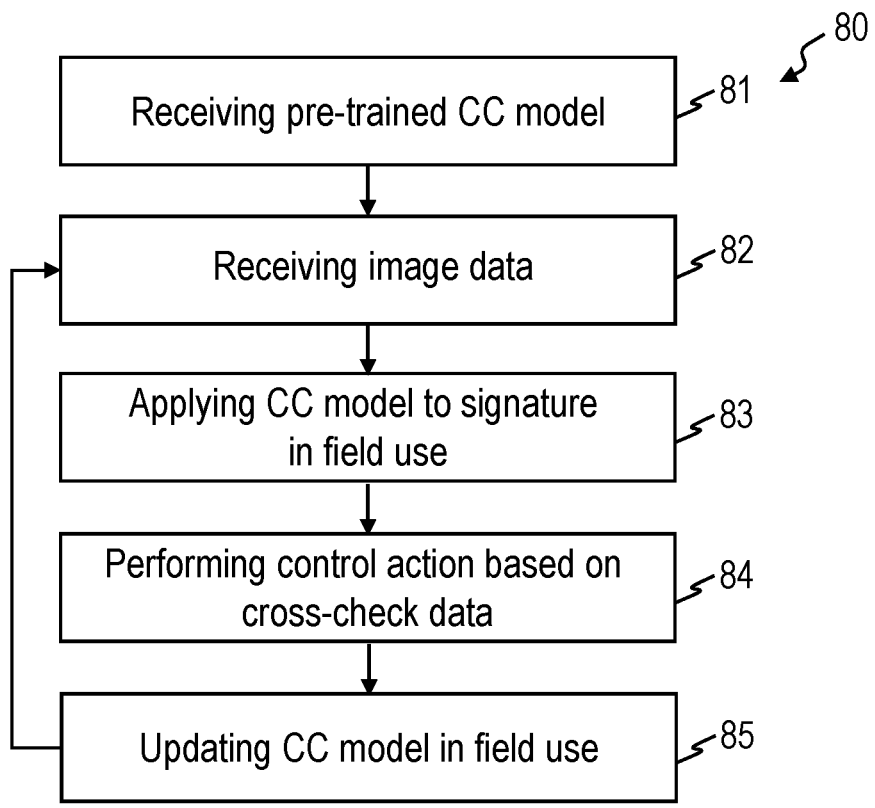
FIG. 8 is a flow chart of a method.

FIG. 8 is a flow chart of a method 80 that may be performed by the image analysis device 20 or system using the cross-checking module 62.

At step 81, a pre-trained cross-check (CC) model is received. The CC model may be an AI model. The pre-training of the CC model may be implemented at the server 42. The CC model may be associated with a (first) AI model used for image analysis by the image analysis device 20 or system.

At step 82, image data is received.

At step 83, the image analysis device 20 or system applies the CC model to an explainability signature generated for an image analysis performed on the image data. This may be implemented as previously explained. Cross-check data is generated, which may be data indicating whether or not the image analysis module is believed to be incorrect and/or providing a further classification of the image data into the same set of classes as the image analysis module, but using the explainability signature as (additional) input.

At step 84, a control action may be taken which depends at least on the cross-check data. The cross-check data may be used to flag potentially incorrect image analysis results, to generate a consolidated analysis result (using, e.g., voting techniques that may take into account confidence scores of the image analysis module and the CCAI), and/or to otherwise combine the cross-check data with the image analysis output provided by the image analysis module.

At step 85, the CC model may be updated during its field use. This may include updating weights of an ANN and/or updating parameters of a K-means clustering technique. The method may return to step 82 and may apply the updated CC model to the image data received after the update process.

Figure 9:
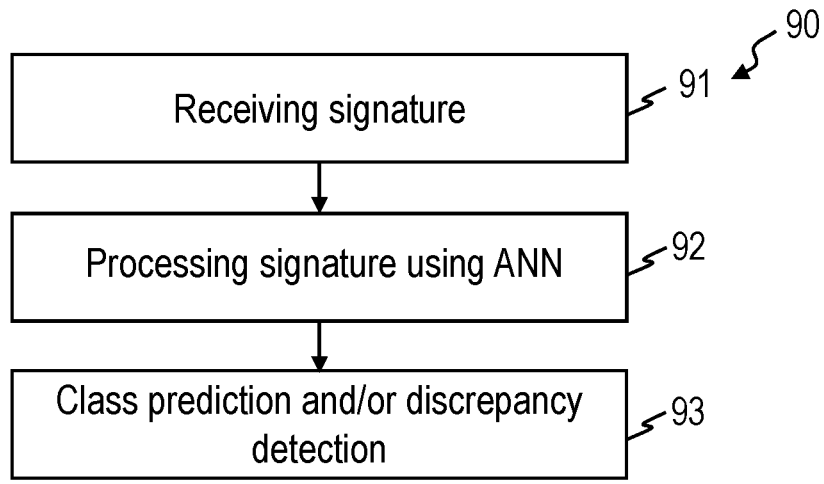
FIG. 9 is a flow chart of a method.

FIG. 9 is a flow chart of a method 90 that may be performed by the cross-checking module 62 of the image analysis device 20 or system.

At step 91, an explainability signature is received. The explainability signature may be received from the explainability module 63.

At step 92, the explainability signature as well as other input (such as the image data received for analysis and the image analysis output generated by the image analysis module) may be processed to generate cross-check data. An ANN (such as a CNN or MLP) may be used. The inputs of the ANN may be an N-tuple including at least M pixel or voxel values of the explainability signature, M pixel or voxel values of the image data (optionally after pre-processing), and the image analysis output of the image analysis AI module 62. The N-tuple may optionally include the confidence score of the image analysis AI module 62. Thus, the number of input nodes and, optionally, number of layers of the ANN used to implement the cross-checking module 62 may be dependent on the number of voxels or pixels in the heatmap (i.e., the explainability signature).

At step 93, a class prediction and/or discrepancy indicator is provided as output by the cross-checking module, as previously described.

Figure 10:
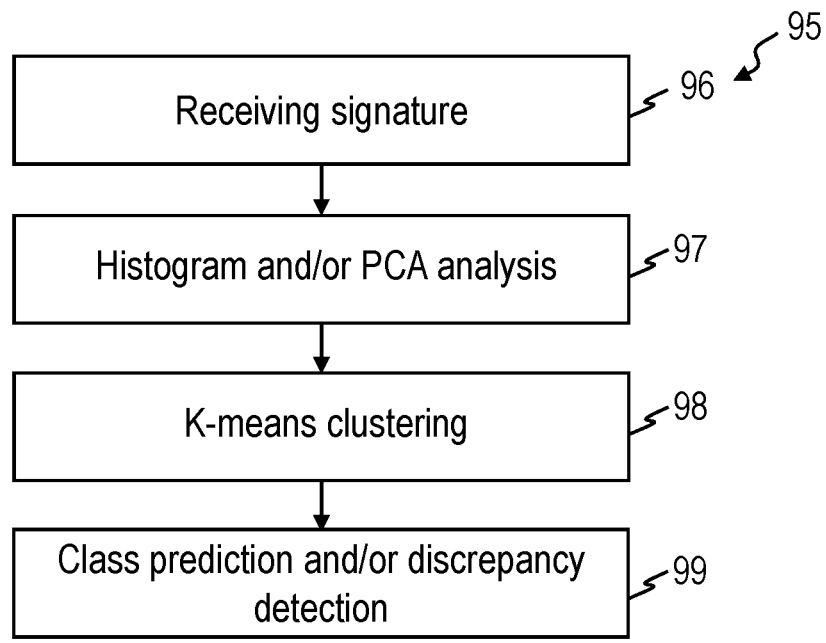
FIG. 10 is a flow chart of a method.

FIG. 10 is a flow chart of a method 95 that may be performed by the cross-checking module 62 of the image analysis device 20 or system.

At step 96, an explainability signature is received. The explainability signature may be received from the explainability module 63.

At step 97, a histogram and/or PCA analysis may be performed on the explainability signature. For illustration, a histogram analysis, a PCA analysis, or a histogram analysis followed by PCA may be applied to the explainability signature.

At step 98, the results of the histogram and/or PCA analysis are input to K-means clustering.

At step 99, a class prediction and/or discrepancy indicator is provided as output by the cross-checking module, as previously described.

Figure 11:
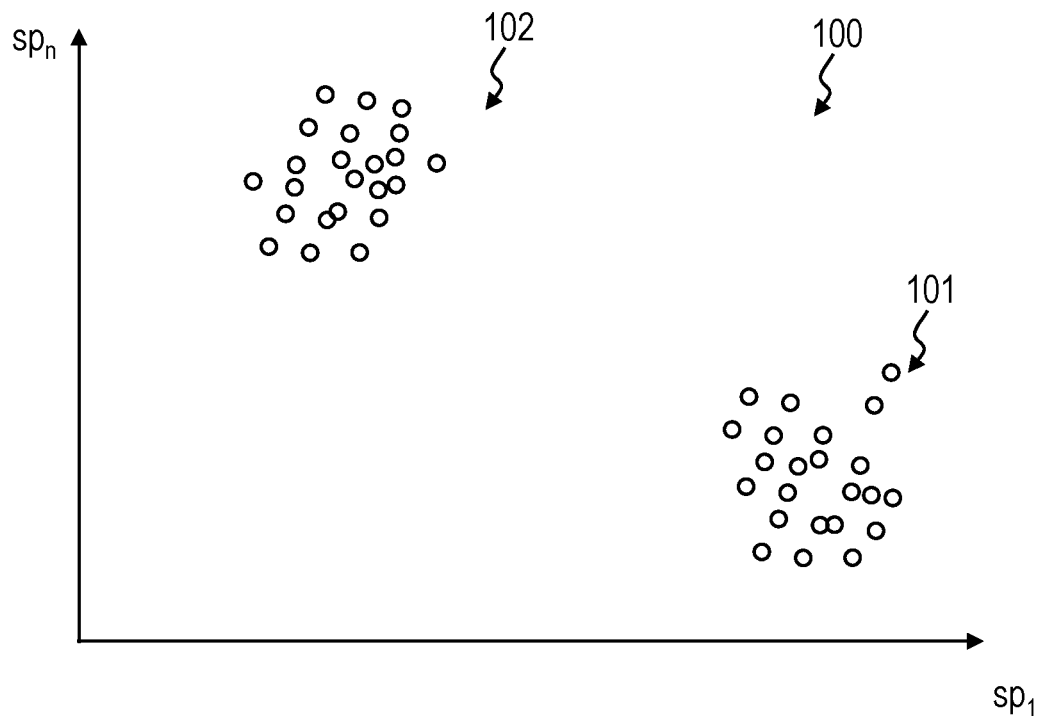
FIG. 11 is a diagram illustrating operation of a cross-checking artificial intelligence of an image processing device or system.

FIG. 11 shows an example of results of a K-means clustering applied to histogram and/or PCA data generated from an N-tuple of inputs of the CCAI module including the explainability signature. The K-means clustering generates a plurality of cluster 100 including clusters 101, 102. Cluster 101 may be associated with image data for which the CCAI module 64 finds, based on the explainability signature and optional other input, that the image analysis output is likely to be incorrect. Cluster 102 may be associated with image data for which the CCAI module 64 finds, based on the explainability signature and optional other input, that the image analysis output is likely to be correct. In another example, clusters 101, 102 may be associated with different machine-generated diagnoses (presence or absence of a neurological or cancerous condition).

Figure 12:
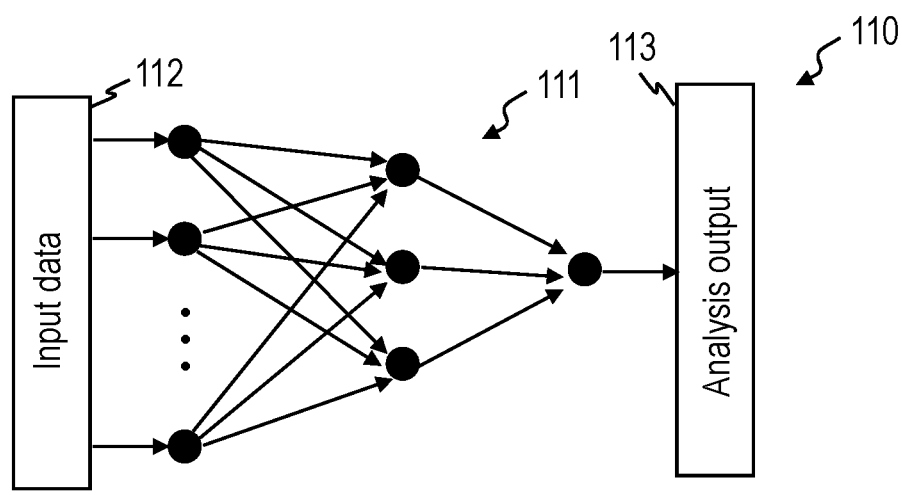
FIG. 12 is a diagram illustrating operation of an image analysis module of an image processing device or system.

FIG. 12 shows a simplified example of an ANN architecture that may be used in the AI analysis module 62 and/or the CCAI module 64. The ANN 111 has a number of nodes arranged in a number of layers. When an ANN architecture is used for both the AI model used in the AI analysis module 62 and the CCAI module 64, the ANNs may be different with regard to the number of layers and number of input nodes. For illustration, the ANN used for the CCAI module 64 may have a greater number of input nodes than the ANN used for the AI analysis module 62.

The ANN receives input data 112 (which is different for the ANN used in the AI analysis module 62 and the ANN used for the CCAI module 64). The ANN generated an output 113, which may be a classification into the same set of classes (for the ANN used in the AI analysis module 62 and the ANN used for the CCAI module 64) or that may be a (binary or other) indicator, in case of the ANN used for the CCAI module 64, indicating whether the CCAI module 64 considers the image analysis output to be incorrect.

While the generation of the cross-check data may be based on an AI model, this does not need to be the case. For illustration, methods from statistical image analysis may be used to extract and detect features. Examples include histogram, PCA, edge detection, segmentation, convolution. The techniques may include correlation metrics, or gaussian distance to a set average, etc. These techniques are applied to input data that includes at least the explainability signature.

The image analysis device 20 or system may be used in a distributed computing system. The distributed computing system may comprise a plurality of image analysis devices 20 or systems as previously described and, optionally, a server.

Figure 13:
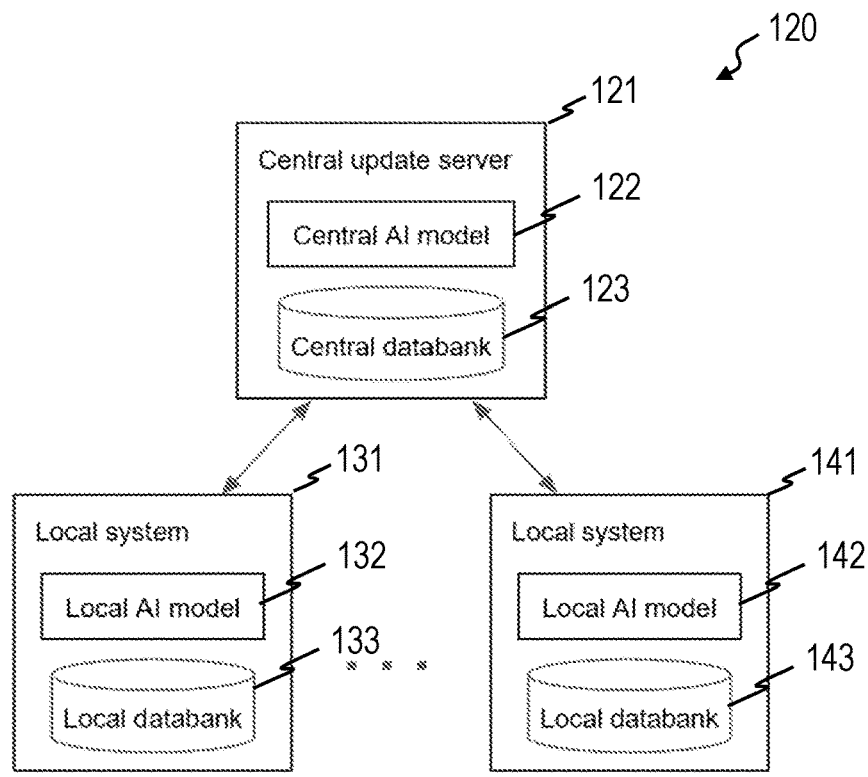
FIG. 13 is a block diagram of a distributed computing system.

FIG. 13 is a schematic block diagram of a distributed computing system 120. A central update server 121 holds a central AI model 122 pre-trained on a central databank 123. The central databank may be available only to the maintainer. Local AI models 132, 142 can be updated, according to some subscription, with the renewed central AI model 122. The knowledge extracted from the central databank 123 is encoded into the central AI model 122 and is thus transferred to the local systems 131, 141, without any data sharing of the data that was used to generate the central AI model 122. Local databanks 133, 143 may be used for distributed AI model validation and/or distributed ML of the AI model.

It should be understood that the AI models 122, 132, 142 and the concepts of distributed AI model validation and/or distributed ML of the AI model are applicable to and may be used for any one or both of the (first) AI model used for data analysis in the module 62 and the (second) AI model used in the CCAI 64 (if the cross-check is performed using a second AI).

Figure 14:
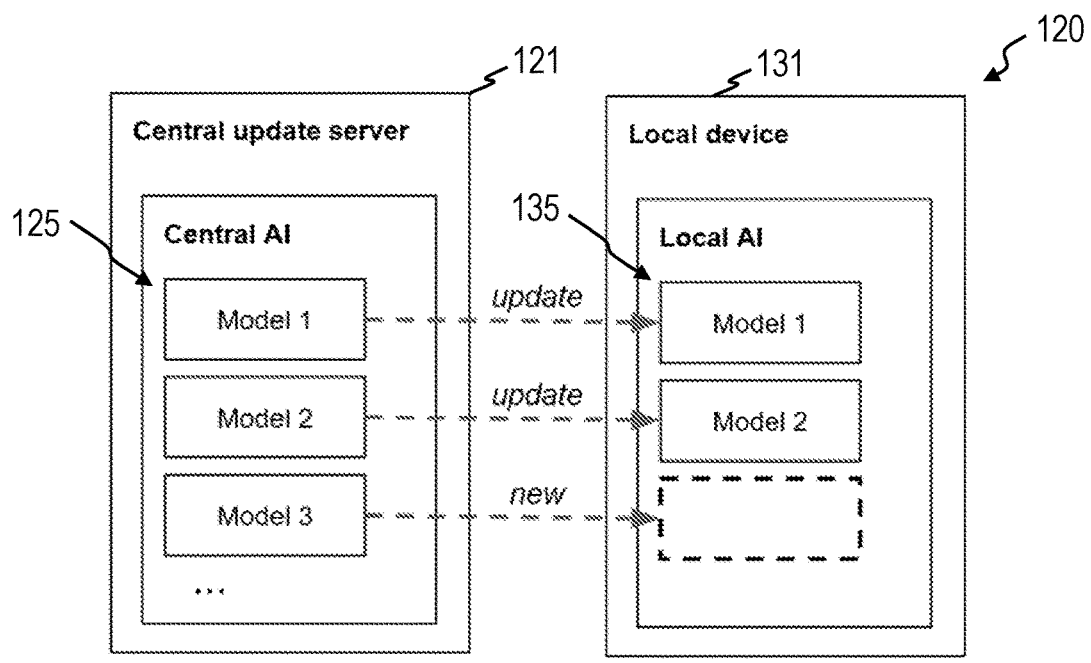
FIG. 14 illustrates operation of the distributed computing system.
Figure 15:
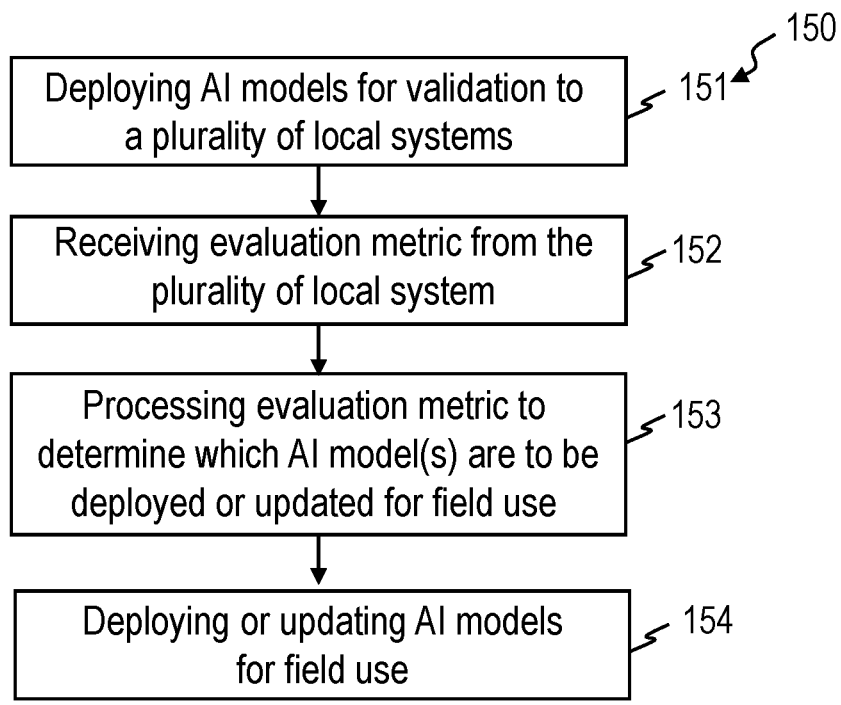
FIG. 15 is a flow chart of a method.
Figure 16:
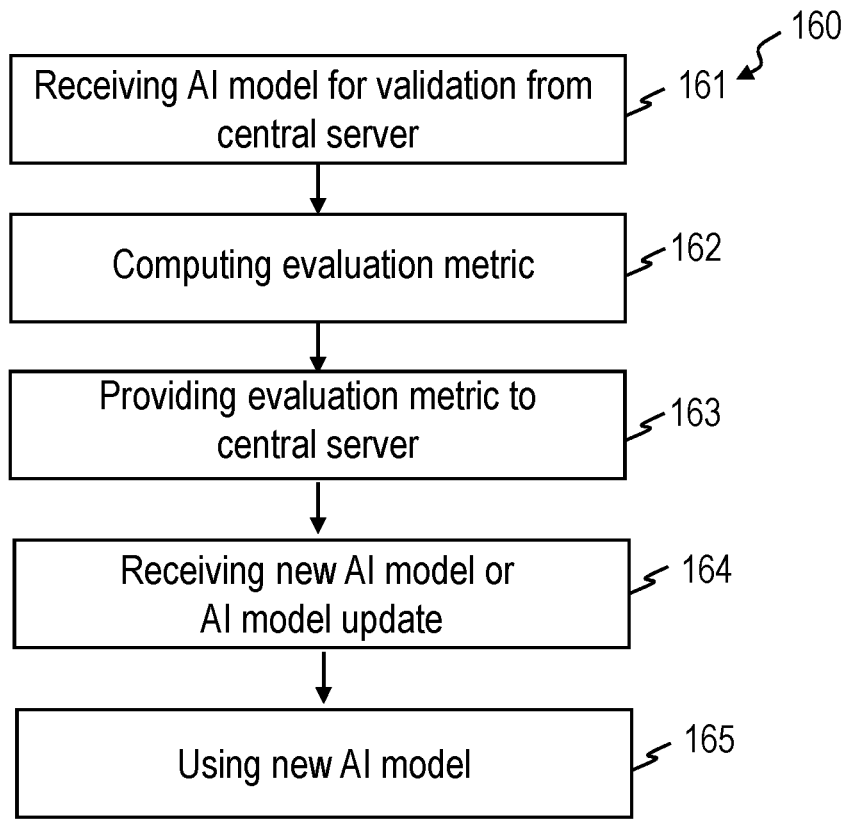
FIG. 16 is a flow chart of a method.

FIG. 14 shows an block diagram in which local AI models 125 may be updated based on newer models 125 available at the central update server 121. New models 125 may be downloaded to enable analysis in new application domains, for new types of data (e.g. new types of diseases).

A plurality of different (first) AI models associated with different types of diseases and/or a plurality of associated different (second) AI models associated with these first AI models may be validated, trained, and/or distributed.

Procedures that may be implemented in the distributed computing system are described below.

Device Performance Update Through Central Model Server

Local devices 131, 141 (which may each be configured as image analysis device 20 as described herein) are operative to connect to a central update server 121 to, for instance, acquire updates to the local AI model 132, 142 for performing a specific type of analysis, or download new models intended for new application domains, i.e. analyzing new types of data (FIGS. 13 and 14). The process visualized in FIGS. 3-6 is hence specific to a specific data application (e.g. Alzheimer's disease detection), but a local device 131, 141 may support multiple such processes for other applications (such as cancer type classification, or pedestrian detection, etc.) where the modules described above would then utilize the corresponding AI model for that application, provided by the update server 121.

Distributed Model Validation Prior to Model Deployment

As described above, the data processing pipeline may be implemented as a partially automated process in which a UI is controlled to provide information to a human operator (such as a field expert, e.g., a medical doctor). The human operator may be aided in taking their final decision, based on the various information made available by the proposed image analysis device or system. This decision may agree with the AI analysis, but it is particularly useful if e.g. the output from the Explainability and CCAI module highlights features which enable the human operator to detect that the AI output is incorrect, and instead the image analysis device or image 20 requests the human operator to input a correct label, to be stored in the databank. In some instances the AI may abstain from providing an output due to low confidence, in which cases an operator-provided label may be used for storing. Over time, this builds up a local dataset of labeled data, which is used to locally to validate new updated model candidates. The validation result is communicated back to the central update server 121, where they are aggregated and used for validation of the candidate.

The distributed validation may be performed as follows:
1. A new model candidate is developed centrally by the central update server 121
2. The model candidate is transmitted to a subset of deployed devices 131, 141
3. Locally on each deployed device 131, 141, the model candidate is evaluated on the locally acquired dataset 133, 143.
4. Performance metrics are transmitted back to server 121, where they are aggregated to compute a reliable measure of the general performance of the model candidate
5. The server 121 decides whether to deploy the model update or not.

New model candidates, or other system updates, may hence be evaluated without any need for sharing or transmitting confidential data such as the image data (or other data) used locally for making the model validation. This makes the process particularly suitable for applications where data integrity is important.

Continuous Data-Agnostic Distributed Learning

ML algorithms can be running locally in the deployed devices 131, 141 using the locally collected databanks 133, 143 to (i) improve the local model and (ii) transmit updates to the model or new models to other devices or to the server 121, where they can be aggregated to later contribute to a new candidate model update.

In the following, the beneficial effects of devices, systems, and methods according to embodiments are illustrated Case Study A The AI analysis module 62 uses a (first) ANN which is trained for classification of common objects on the standard benchmark dataset CIFAR10. The explainability module 63 employs an LRP-based functionality, generating heatmaps corresponding to single input images, with respect to the trained AI model. The CCAI module 64 contains an additional ANN structure, which is trained to perform classification on the same classes, however with the heatmaps being included in the inputs.

The CCAI module 64 performed more accurately than the original AI analysis 62. I.e. training on the heatmaps gave in this instance higher performance accuracy than training on the original images. This entails a performance gain with 3% classification accuracy, which is a substantial improvement in this domain.

Using both these modules 62, 64 in conjunction in a consensus scheme (i.e. giving an output only if these systems agree) significantly reduces the error rate since, as shown in Table 1, 200 images that were misclassified by the AI Analysis module were classified correctly by the CCAI module, meaning these mistakes are corrected. This setup however means that for the images were the systems do not agree, there is no no overall output from the device 20. This makes the use of a consensus scheme particularly suitable for safety-critical applications, where no output is better than an incorrect one.

TABLE 1

|  | total | AI analysis 62 misclassifications | CCAI 64 misclassifications | corrected by CCAI 64 in consensus scheme |
| --- | --- | --- | --- | --- |
| Dataset | 10000 | 2100 | 1800 | 200 |
| Accuracy [%] | — | 79 | 82 | 3 |

Case Study B

The AI analysis module 62 is a (first) ANN which is trained for Parkinson's disease detection, by binary classifying of DaTscan images. The dataset consists of 1300 patients with dopamine transporter single-photon emission computed tomography (DAT-SPECT) imaging, 600 healthy controls, and 700 Parkinson's disease. The images where normalized in the Montreal Neurological Institute (MNI) anatomical space.

The explainability module 63 uses LRP for generating heatmaps, similarly to case study A.

The CCAI module 64 uses a (second) ANN model, which in this case is trained to detect mistakes by the AI Analysis module. In other words, the CCAI module is trained for binary classification of the explainability heatmaps, sorting them into ones which were misclassified by the AI analysis module, and ones which not.

As shown in Table 2, the AI analysis misclassified 13 patients. The CCAI module managed to detect 5 of these. Using the systems on conjunction, requiring consensus for output, this would mean in practice that the error rate of the systems is reduced from 4:3% to 2:6%, which is a substantial improvement, considering the application domain in question.

Based on this result, an inquiry was made to a field expert regarding these particular misclassified cases, and it was discovered that 4 out of these 16 patients had atypical patterns in their diagnostic images, and another 4 were at the borderline between healthy and diagnosed. In other words, the system managed to flag the cases which were particularly interesting, and where the primary AI Analysis module was insecure (with good reason), as well as incorrect.

TABLE 2

|  | total | AI analysis 62 misclassifications | CCAI 64 misclassifications | corrected by CCAI 64 in consensus scheme |
| --- | --- | --- | --- | --- |
| Dataset | 300 | 13 | 16 | 5 |
| Accuracy [%] | — | 95.6 | 96.3 | 0.7 |

Various effects and advantages are attained by the devices, systems, and methods according to embodiments. The devices, systems, and methods according to embodiments provide enhanced techniques suitable for image processing (without being limited thereto), which afford enhanced reliability and/or enhanced data privacy.

When implementing an automatic processing of an explainability signature by the processing device or system, inconsistencies can be detected. Reliability can be enhanced.

When implementing a distributed architecture in which a server provides one or several AI model candidate(s) to several distinct processing devices or systems that each use their local labeled datasets for AI model validation, distributed model validation may be performed while ensuring data privacy.

When implementing a distributed architecture in which several distinct processing devices or systems perform AI model training using their local datasets, distributed AI model training may be performed while ensuring data privacy. Only updates to the AI model parameters (such as the activation functions or weights used) and/or AI model topology need to be exchanged between the distinct processing devices or systems.

While embodiments of the invention have been described in the context of medical image analysis, the techniques are not limited thereto. The devices, systems, and method according to embodiments may be used for processing image data or other data in industrial applications, autonomous driving, or driver assistance, without being limited thereto.

The invention claimed is:

1. An image processing device or system, in particular for medical image processing, comprising:
    an interface to receive image data;
    a storage system;
    at least one integrated circuit operative to:
        retrieve an image analysis model from the storage system;
        perform an image analysis that comprises applying the image analysis model to the image data to generate an image analysis output;
        generate an explainability signature for the image analysis, the explainability signature being or comprising heatmap data wherein the heatmap data quantifies, for each of several pixels or voxels of the image data, how strongly the pixel or voxel affects the image analysis output for the image data;
        process at least the explainability signature to generate cross-check data indicative of a possible discrepancy in the image analysis, wherein the possible discrepancy is an erroneous classification or an erroneous prediction performed by the image analysis model when generating said image analysis output, which thereby indicates that the explainability signature is inconsistent with the image analysis output and/or a systematic issue of said image analysis model;
        detect the possible discrepancy in the image analysis based on the cross-check data; and
        initiate a control action that depends on the cross-check data.

2. The image processing device or system of claim 1, wherein the control action that depends on the cross-check data is or comprises at least one of:
    causing a label that is dependent on the cross-check data to be stored in association with the image data;
    combining the image analysis output with the cross-check data to generate a consolidated image analysis result;

causing outputting of the cross-check data.

3. The image processing device or system of claim 2, wherein the consolidated image analysis result comprises an image classification selectively when image classifications obtained by applying the image analysis model to the image data and by processing the explainability signature are in agreement.

4. The image processing device or system of claim 1, wherein the at least one integrated circuit is operative to use a labeled dataset comprising the image data and a label that is dependent on the cross-check data for performing machine learning, ML, for an artificial intelligence, AI, model and/or AI model validation.

5. The image processing device or system of claim 4, wherein the at least one integrated circuit is operative to use the labeled dataset comprising the image data and the label that depends on the cross-check data to perform AI model validation of a candidate AI model received from a server and/or to provide a validation result of the AI model validation to the server.

6. The image processing device or system of claim 5, wherein the validation result comprises a performance metric of the candidate AI model determined using the labeled dataset.

7. The image processing device or system of claim 5, wherein the image processing device or system is operative to receive from the server at least one of:
an update for the image analysis model;
a new image analysis model;
for use in a subsequent image analysis of other image data responsive to providing the validation result of the AI model validation to the server.

8. The image processing device or system of claim 1, further comprising a human machine interface, HMI, operative to output the cross-check data.

9. The image processing device or system of claim 8, wherein the at least one integrated circuit is operative to generate and store the label responsive to a user input received at the HMI.

10. The image processing device or system of claim 1, wherein the at least one integrated circuit is operative to initiate outputting of the image analysis output selectively dependent on whether the cross-check data indicates that there is no discrepancy between the explainability signature and the image analysis output and/or to flag outputting of the image analysis output when the cross-check data indicates that there is a discrepancy between the explainability signature and the image analysis output.

11. The image processing device or system of claim 1, wherein the at least one integrated circuit is operative to determine the cross-check data to be indicative of at least one of:
an inconsistency between the explainability signature and the image analysis output;
a systematic issue with the image analysis model, optionally wherein the systematic issue includes at least one of overfitting or underfitting or a drift when training the image analysis model.

12. The image processing device or system of claim 1, wherein the at least one integrated circuit is operative to execute a second artificial intelligence, AI, model to determine the cross-check data and to re-train the second AI model in field use of the processing device or system.

13. The image processing device or system of claim 12, wherein the second AI model is trained with an objective of:
classifying the image data using inputs that comprise the explainability signature;
detecting erroneous image analysis output from the image analysis using inputs that comprise the explainability signature.

14. The image processing device or system of claim 12, wherein the at least one integrated circuit is operative to determine the cross-check data by processing a vector having vector elements that comprise at least pixel values or voxel values of the explainability signature.

15. The image processing device or system of claim 14, wherein the vector has additional vector elements that comprise pixel or voxel values of the image data.

16. The image processing device or system of claim 1, wherein the at least one integrated circuit is operative to determine the cross-check data using at least one of a principal component analysis, PCA, an artificial neural network, ANN, histogram analysis, K-means clustering.

17. The image processing device or system of claim 1, wherein the image analysis model is an artificial neural network, ANN, model.

18. The image processing device or system of claim 1, wherein the explainability signature is or comprises heatmap data.

19. The image processing device or system of claim 18, wherein the heatmap data quantifies, for each of several pixels or voxels of the image data, how strongly the pixel or voxel affects the image analysis output for the image data.

20. The image processing device or system of claim 1, wherein the image data is medical image data.

21. A distributed computing system, comprising:
a plurality of image processing devices or systems, at least some of the image processing devices or systems being an image processing device or system according to claim 1; and
a server operative to be communicatively coupled to the plurality of image processing devices or systems.

22. The distributed computing system of claim 21, wherein the server is operative to:
provide candidate AI models to at least a subset of the plurality of image processing devices or systems for validation,
receive validation results from the subset of the plurality of image processing devices or systems, and
decide which one of the AI models is to be deployed to the plurality of image processing devices or systems based on the received validation results.

23. An image processing method, comprising the following steps performed by an image processing device or system:
performing an image analysis that comprises applying an image analysis model to image data to generate an image analysis output;
generating an explainability signature for the image analysis, the explainability signature being or comprising heatmap data wherein the heatmap data quantifies, for each of several pixels or voxels of the image data, how strongly the pixel or voxel affects the image analysis output for the image data;
processing at least the explainability signature to generate cross-check data indicative of a possible discrepancy in the image analysis, wherein the possible discrepancy is an erroneous classification or an erroneous prediction performed by the image analysis model when generating said image analysis output, which thereby indicates that the explainability signature is inconsistent with the image analysis output and/or a systematic issue of said image analysis model;

detecting the possible discrepancy in the image analysis based on the cross-check data; and initiating a control action that depends on the cross-check data.

* * * * *